(12) United States Patent
Kashiki et al.

(10) Patent No.: US 7,738,184 B2
(45) Date of Patent: Jun. 15, 2010

(54) ZOOM LENS AND IMAGING APPARATUS INCORPORATING THE SAME

(75) Inventors: Yasutaka Kashiki, Hino (JP); Yasuharu Yamada, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/386,277

(22) Filed: Apr. 15, 2009

(65) Prior Publication Data

US 2009/0262236 A1    Oct. 22, 2009

(30) Foreign Application Priority Data

Apr. 18, 2008  (JP) .............................. 2008-108900
Jun. 20, 2008  (JP) .............................. 2008-161488

(51) Int. Cl.
*G02B 15/14* (2006.01)
(52) U.S. Cl. ..................................... 359/684
(58) Field of Classification Search ................ 359/676, 359/684, 691, 708, 649
See application file for complete search history.

(56) References Cited

U.S. PATENT DOCUMENTS

2002/0196560 A1* 12/2002 Endo ......................... 359/684

2003/0234985 A1  12/2003 Sato
2007/0070520 A1   3/2007 Kimura et al.

FOREIGN PATENT DOCUMENTS

| JP | 2001-166206 | 6/2001 |
| JP | 2004-021223 | 1/2004 |
| JP | 2007-094176 | 4/2007 |

* cited by examiner

*Primary Examiner*—Alicia M Harrington
(74) *Attorney, Agent, or Firm*—Kenyon & Kenyon LLP

(57) ABSTRACT

A zoom lens consists of, in order from its object side, a first lens group of negative refracting power, and a second lens group of positive refractive power. Zooming from a wide-angle end to a telephoto end is implemented by changing a distance between the respective lens groups. The first lens group consists of, in order from its object side, a front unit of negative refracting power, and a rear unit of negative refracting power. The front unit consists of, in order from its object side, a first lens that has negative refracting power, and a second lens with smaller refracting power than the first lens. The rear unit consists of, in order from its object side, a third lens of negative refracting power, a fourth lens of negative refracting power, and a fifth lens that has positive refracting power.

14 Claims, 17 Drawing Sheets

Example 4

Example1 (Upon focusing at 250 mm)

Example2 (Upon focusing at infinity)

Example2 (Upon focusing at 400 mm)

FIG.15 Example4 (Upon focusing at 400 mm)

ZOOM LENS AND IMAGING APPARATUS INCORPORATING THE SAME

This application claims benefit of Japanese Application No. 2008-108900 filed in Japan on Apr. 18, 2008 and Japanese Application No. 2008-161488 filed in Japan on Jun. 20, 2008, the contents of which are incorporated by this reference.

BACKGROUND OF THE INVENTION

The present invention relates generally to a wide-angle zoom lens including a wide-angle end having a large angle of view. Specifically, the invention relates to a wide-angle zoom lens used with electronic imaging devices such as CCDs or CMOSs. More specifically, the invention relates to a wide-angle zoom lens well suited for digital single-lens reflex cameras having a reflective surface at a back focus, and an imaging apparatus incorporating the same.

In recent years, the market for single-lens reflex cameras using electronic imaging devices such as CCDs or C-MOSs has grown steadily. However, there have not been many proposals of a superwide-angle zoom lens that has an angle of view of 100° or greater at a wide-angle end, is of small-format size and comprises fewer lenses. For instance, Patent Publications 1, 2 and 3 have come up with a superwide-angle zoom lens having an angle of view of about 102° and a zoom ratio of about 1.9, a superwide-angle zoom lens having an angle of view of about 110° and a zoom ratio of about 1.7, and a superwide-angle zoom lens having an angle of view of about 110° and a zoom ratio of about 1.5, respectively.

Patent Publication 1: JP(A)2004-21223
Patent Publication 2: JP(A)2007-94176
Patent Publication 3: JP(A)2001-166206

For the arrangement of such superwide-angle zoom lenses, it is general that there are a front lens group having negative refractive power and a rear lens group having positive refracting power. In this case, to image light beams incident at a wide range of angles within an electronic imaging device in a predetermined range, it is required to make the negative refracting power of the front group strong. Especially when it is attempted to set up the front group of negative refracting power with fewer lenses so as to reduce the size of the optical system, power loads on the respective lenses increase, rendering correction of aberrations difficult. Even when, in this case, it is intended to use aspheric surfaces to enhance the effect on aberration correction, lens configuration grows more complicated, offering problems such as difficulty of lens fabrication. For light incident on the electronic imaging device, it is desired to have telecentric capability, and it is required to make sure a certain flange back so as to insert various optical filters between the electronic imaging device and the optical system, which arises a problem that the total length of the optical system grows long. For that very reason, the diameter of lenses forming the front group having negative refracting power grows large, offering an obstacle to size reductions of the optical system.

With the superwide-angle zoom lens set forth in Patent Publication 1 (JP(A)2004-21223), superwide-angle design is achieved by using a lot of aspheric surfaces while the negative front group is simplified in construction. Because the power construction of the first lens that is an aspheric surface is not tight, however, that zoom lens is still less than satisfactory in both total length reductions and diameter reductions.

With the superwide-angle zoom lens disclosed in Patent Publication 2 (JP(A)2007-94176), the correction of aberrations necessary for superwide-angle design is implemented by applying aspheric surfaces to the negative second lens. For this reason, however, the first lens grows large, failing to achieve size reductions.

With the superwide-angle zoom lens shown in Patent Publication 3 (JP(A)2001-166206), the correction of aberrations necessary for superwide-angle design is implemented by applying aspheric surfaces to the first and second lenses having negative refracting power and incorporating a plurality of positive lens components in the first lens group. To this end, however, a lot more lenses of strong power are needed, rendering the optical system bulky. In addition, that zoom lens is generally unsatisfactory in terms of how to avoid decentration and slash cost.

Having been made with the aforesaid problems in mind, the invention has for its object the provision of a small-format, superwide-angle zoom lens that is well compatible with a lens interchangeable type single-lens reflex camera through the optimization of the construction of the first group, and an imaging apparatus incorporating the same.

SUMMARY OF THE INVENTION

According to the invention, the aforesaid object is accomplishable by the provision of a zoom lens consisting of, in order from its object side, a first lens group having negative refracting power and a second lens group having positive refracting power and designed to implement zooming by changing a distance between the lens groups upon zooming from a wide-angle end to a telephoto end, wherein said first lens group consists of, in order from its object side, a front unit having negative refracting power and a rear unit having negative refracting power, wherein said front unit consists of, in order from its object side, a first lens including a meniscus aspheric surface having negative refracting power and a second lens group including an aspheric surface having an absolute value of refracting power smaller than an absolute value of refracting power of said first lens, said rear unit consists of, in order from its object side, a third lens having negative refracting power, a fourth lens having negative refracting power and a fifth lens that is convex on its object side and has positive refracting power, and upon focusing from infinity to point-blank range, said rear unit draws near to the object side as the space between said front unit and said rear unit becomes narrow.

For single-lens reflex cameras that have to have a certain flange back, superwide-angle zooms that have a short real focal length and are of a retrofocus type negative-positive profile are frequently used so as to make sure the flange back.

The retrofocus type often relies upon the first lens group having negative refracting power, which is constructed of negative and positive units wherein the ensuing positive aberrations are corrected by negative refracting power. However, as a lens of positive refracting power is located for the correction of aberrations, negative refracting power that is in excess of that positive refracting power is needed to meet optical specifications (primarily focal length and flange back). This is not preferable for a superwide-angle lens having an angle of view greater than 100°, because of producing excessive higher-order aberrations with respect to light beams at large angles of view, and offering a large obstacle to size reductions as well. With these factored in, it is preferable to take on an arrangement comprising the front unit having negative refracting power and the rear unit having negative refracting power.

Referring here to the correction of aberrations, various aberrations in general, and coma and distortion in particular occur considerably at the first lens group having negative refracting power. These aberrations are effectively corrected by surfaces where light beams are separate; in view of optical performance, it is preferable to use an aspheric lens for the lens located on the object side. However, when it comes to a superwide-angle range having an angle of view of greater than 100°, the amount of distortion and coma produced increases to such large a degree that they cannot be corrected only by use of one aspheric lens.

Thus, at the front unit, distortion and coma in particular are corrected with the first, meniscus aspheric lens that is located on the object side and has negative refracting power, and a portion of coma that remains undercorrected with the first lens is corrected with the second lens having an absolute value of power smaller than that of the first aspheric lens.

At the rear unit, longitudinal aberrations produced at the front unit are primarily corrected. The fifth lens that is in the rear unit and has positive refractive power is only one positive lens in the first lens group, and that positive lens makes correction of positive aberrations produced not only in the rear unit but also in the first lens group.

Negative power is dispersed to the third lens having negative refracting power and the fourth lens having negative refractive power in the rear unit, thereby holding back the occurrence of aberrations in the rear unit. Note here that more lenses than that are not preferable, because of going against size reductions.

For size reductions of a superwide-angle lens, it is impeccable to keep low the position of an entrance pupil in general, and the position of an entrance pupil corresponding to a peripheral image height in particular. Although the first lens has strong negative power, it is not that preferable for the second lens group to have much stronger negative power. As already mentioned, imparting strong positive power to the second lens, too, is not preferable because there are higher-order aberrations produced, a factor for performance deterioration due to decentration.

Further, when it comes to a superwide-angle lens, strong field curvature occurs around in the positive direction upon focusing movement by letting out the first lens group. If, at this time, the space between the front unit and the rear unit is narrowed down while letting out the first lens group, it is then possible to produce field curvature in the negative direction, thereby making sure good peripheral performance even at point-blank range.

Aberrations from the aspheric surface in the front unit are corrected at so higher-order levels that aberrations from a floating mechanism due to decentration between the front unit and the rear unit are held back. Further, this mechanism enables the amount of the front unit let out to be relatively small with the result that it is possible to avoid any increase in the effective diameter of the lens in association with letting out the front unit, again contributing to size reductions.

The invention also provides an optical system consisting of, in order from its object side, a first lens group having negative refracting power and a second lens group having positive refracting power and designed to implement zooming by changing a distance between the lens groups upon zooming from a wide-angle end to a telephoto end, wherein said first lens group consists of, in order from its object side, a front unit having negative refracting power and a rear unit having negative refracting power, wherein said front unit consists of, in order from its object side, a first, meniscus aspheric lens having negative refracting power and a second, aspheric lens having an absolute value of refracting power smaller than an absolute value of refracting power of said first lens, and said rear unit consist of, in order from its object side, a third lens having negative refracting power, a fourth lens having negative refracting power and a fifth lens that is convex on its object side and has positive refracting power, with satisfaction of the following conditions (1) and (2):

$$-1.00 < R_{01\_im}/\{(nd_{o1}-1) \times f_{101}\} < -0.92 \quad (1)$$

$$0.40 < (SAG_{01\_im} - SAG_{01\_ob})/R_{01\_im} < 0.48 \quad (2)$$

where $R_{01\_im}$ is the paraxial radius of curvature of the image side surface of said first lens, $nd_{01}$ is the d-line refractive index of said first lens, $f_{101}$ is the focal length of said first lens, $SAG_{01\_im}$ is the amount of sagging of the diameter of the image side surface of said first lens as a chief ray of the maximum image height passes upon focusing at infinity at the wide-angle end, and $SAG_{01\_ob}$ is the amount of sagging of the diameter of the object side surface of said first lens as a chief ray of the maximum image height passes upon focusing at infinity at the wide-angle end.

Condition (1) represents the power profile of the front and back surfaces of the first lens, indicating that the power profile of the first lens is substantially made up of the image side surface, and the object side surface is a convex one of weak power. Referring generally to a wide-angle lens, configuring the first surface into a concave shape is not preferable because there are some considerable higher-order aberrations produced. A conventionally often used shape convex on its object side may help reduce the occurrence of aberrations; however, it undermines the negative power itself of the first lens, giving rise to a diameter increase, an increase in the number of lenses involved, or an increase in the curvature on the image plane side, which may otherwise interfere with correction of aberrations.

For that reason, as the upper limit of −0.92 to condition (1) is exceeded, it causes the positive power of the first surface to grow large and the curvature of the image plane side to grow large, rendering good correction of aberrations difficult, and being short of the lower limit of −1.00 is not preferable for correction of aberrations, because there are higher-order aberrations growing large at the first surface.

More preferably, condition (1) is narrowed down to the following range.

$$-0.97 < R_{01\_im}/\{(nd_{o1}-1) \times f_{101}\} < -0.93 \quad (1')$$

Condition (2) is to normalize the amount of sagging of the front and back surfaces of said first lens in terms of the image-side radius of curvature. As already noted, the object side surface of the first lens has paraxially weak positive power: most of the negative power is substantially born by the image plane side. When it comes to an aspheric surface on the image plane side, that aspheric surface must function in a direction toward weakening negative power so as to correct aberrations occurring at an image height due to strong negative power. The spillover effect is that an effective diameter greater than the radius of curvature may be ensured with respect to the paraxial radius of curvature. When it comes to the amount of sagging, the ratio of the amount of sagging to the radius of curvature is going to be determined to some degrees from requirements for aberration correction and processing. When it comes to the aspheric surface on the object plane side, configuring it into shape having the amount of sagging in the direction toward the image plane is effective for correction of aberrations so as to hold back the occurrence of aberrations from incident light rays determined by super-wide-angle specifications.

With these factored in, as the upper limit of 0.48 to condition (2) is exceeded, the effect of the aspheric surface on correction of aberrations is not satisfactorily achieved, rendering correction of aberrations, etc. difficult. Being short of the lower limit of 0.4 to condition (2) is not preferable, not only because the effect of that aspheric surface on correction of aberrations is hardly obtainable, but also because processing becomes much more difficult.

More preferably, condition (2) is narrowed down to the following range:

$$0.40 < (SAG_{01\_im} - SAG_{01\_ob})/R_{01\_im} < 0.46 \quad (2')$$

Preferably, the second lens is a plastic lens. If a plastic lens is used as the second lens, mass production is then achievable at low costs. Note here that the plastic lens that is the second lens is preferably fabricated by molding.

It is also preferable to satisfy the following condition (3):

$$2.95 < f_2/f_w < 3.20 \quad (3)$$

where $f_2$ is the focal length of the aforesaid second lens group, and $f_w$ is the focal length of the whole zoom lens system at the wide-angle end.

Condition (3) is concerned with the focal length of the second lens group. As the lower limit of 2.95 to condition (3) is not reached, it is impossible to make sure any flange back, failing to obtain any function as an interchangeable lens for SLR. Being in excess of the upper limit of 3.20 to condition (3) is not preferable, because the focal length of the second lens group grows too long to interfere with size reductions of optical system.

More preferably, condition (3) is narrowed down to the range mentioned below.

$$2.95 < f_2/f_w < 3.10 \quad (3')$$

Further, it is preferable to satisfy the following condition:

$$0.95 < |f_1|/(f_w \times f_t)^{1/2} < 1.10 \quad (4)$$

where $f_1$ is the focal length of said first lens group, $f_w$ is the focal length of the whole zoom lens system at the wide-angle end, and $f_t$ is the focal length of the whole zoom lens system at the telephoto end.

Condition (4) is concerned with the focal length of said first lens group. Setting that focal length within the range defined by condition (4) helps maintain balances between changes in the total length of the zoom lens due to zooming movement. Being short of the lower limit of 0.95 to condition (4) is not preferable, because the total length grows long at the wide-angle end, resulting in increases in both the optical effective diameter and the total length of the zoom lens. As the upper limit of 1.10 to condition (4) is exceeded, the total length of the zoom lens grows long at the telephoto end, leading to an increase in the size of a lens barrel and rendering it difficult to make sure the focal length at the telephoto end.

More preferably, condition (4) is narrowed down to the range mentioned below.

$$0.97 < |f_1|/(f_w \times f_t)^{1/2} < 1.05 \quad (4')$$

It is preferable that said front unit remains fixed and only the rear unit moves upon focusing. By limiting the focusing group to the rear unit, zoom lens fabrication is facilitated because of a simplified drive mechanism for focusing.

Further, it is preferable to satisfy the following condition:

$$-0.05 < f_{101}/f_{102} < 0.05 \quad (5)$$

where $f_{101}$ is the paraxial focal length of said first lens group, and $f_{102}$ is the paraxial focal length of said second lens group.

Condition (5) is the ratio between the focal lengths of the first lens and the second lens. Being short of the lower limit of −0.05 to condition (5) is not preferable, because the power of the first lens grows too large for correction of higher-order aberrations, and being in excess of the upper limit of 0.05 to condition (5) is not preferable, because an entrance pupil position goes relatively far, rendering the diameter of the front lens too large for size reductions.

More preferably, condition (5) is narrowed down to the range mentioned below.

$$-0.03 < f_{101}/f_{102} < 0.03 \quad (5')$$

Further, it is preferable to satisfy the following condition:

$$0.31 < f1_{\_G1a}/f1_{\_G1b} < 0.39 \quad (6)$$

where $f1_{\_G1a}$ is the combined focal length of said front unit, and $f1_{\_G1b}$ is the combined focal length of said rear unit.

Condition (6) is the ratio between the combined focal lengths of the negative front unit and the negative rear unit that form the first lens group. As the lower limit of 0.31 to condition (6) is not reached, it causes the negative power of the first lens group to be too biased in favor of the front unit, rendering aberration correction difficult. In addition, when the rear unit is allowed to function as a focusing unit, it is difficult to make sure the amount of letting out it. As the upper limit of 0.39 to condition (6) is exceeded, it causes off-axis light beams to gain height, resulting in an increase in the diameter of the front lens and rendering size reductions difficult.

More preferably, condition (6) is narrowed down to the range mentioned below.

$$0.32 < f1_{\_G1a}/f1_{\_G1b} < 0.36 \quad (6')$$

According to the invention as described above, it is possible to provide a wide-angle zoom lens for cameras using electronic imaging devices such as CCDs or C-MOSs, and a wide-angle zoom lens well fit for single-lens reflex cameras having a reflective surface at a back focus as well.

Still other objects and advantages of the invention will in part be obvious and will in part be apparent from the specification The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

The present invention is now explained in more details with reference to the examples shown in the accompanying drawings.

FIGS. 1, 2, 3, and 4 are illustrative in lens arrangement sections of Examples 1, 2, 3, and 4 at the wide-angle end (a), in the intermediate setting (b) and at the telephoto end (c).

Throughout the drawings, the first lens group is indicated by G1, the second lens group by G2, the aperture stop by S, the front unit by Gf, the rear unit by Gr, and the image plane of a CCD or the like by I.

Figure 1:
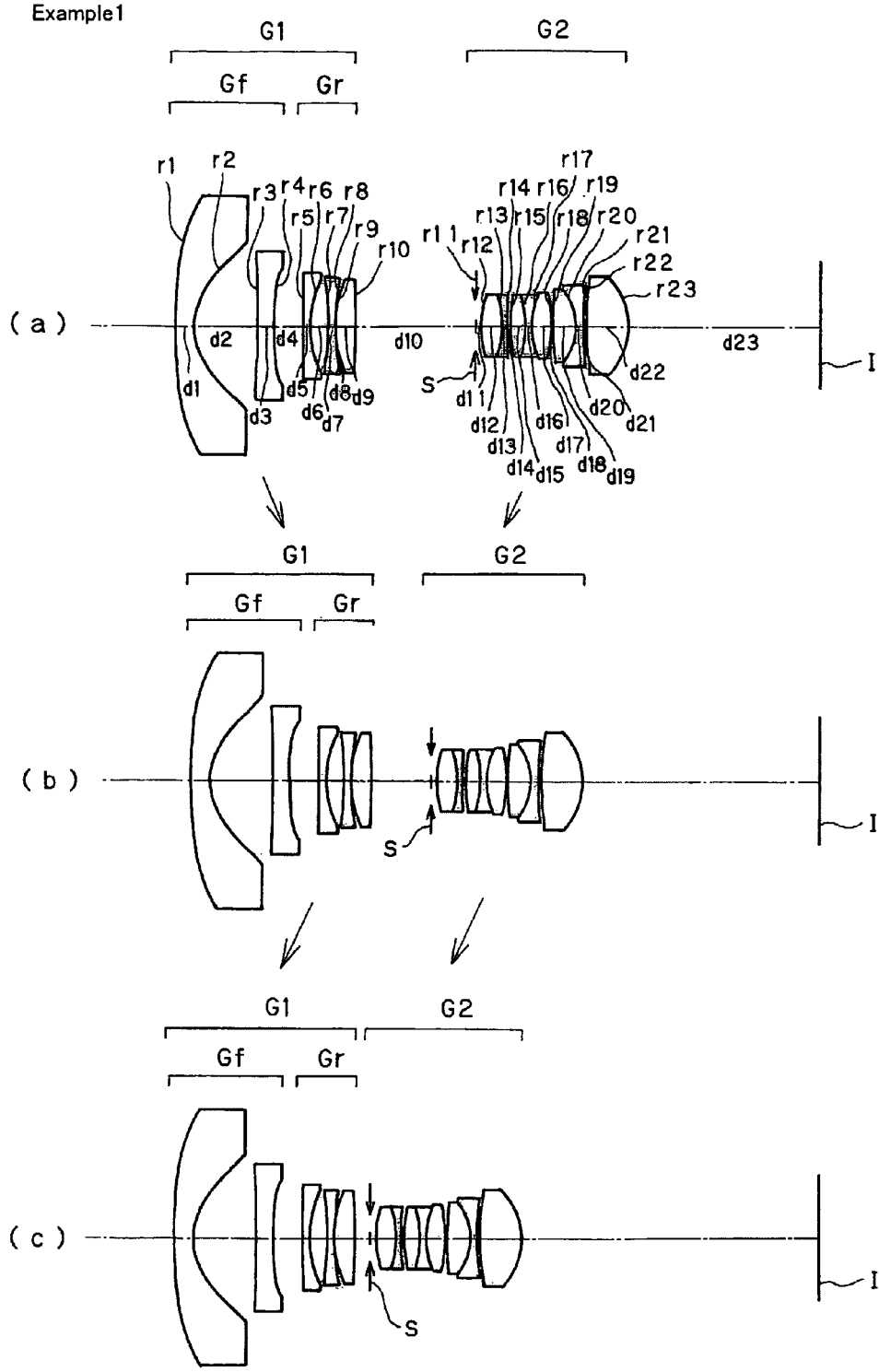
FIG. 1 is illustrative in lens arrangement sections of Example 1 of the inventive zoom lens at the wide-angle (a), in an intermediate setting (b) and at the telephoto end (c) upon focusing on an object at infinity.

As shown in FIG. 1, the zoom lens of Example 1 is made up of, in order from its object side, the first lens group G1 of negative refracting power, the aperture stop S, and the second lens group G2 of positive refracting power, and the first lens group is made up of, in order from its object side, the front unit Gf of negative refracting power and the rear unit Gr of negative refracting power.

Upon zooming from the wide-angle end to the telephoto end, the respective lens groups move as follows.

The first lens group G1 moves toward the image side while the space between it and the second lens group G2 becomes narrow from the wide-angle end to the intermediate setting, and moves toward the object side while the space between it and the second lens group G2 becomes narrow from the intermediate setting to the telephoto end. At the telephoto end, the first lens group G1 is positioned a little more on the image side than at the wide-angle end.

The aperture stop S and the second lens group G2 move toward the object side while the space between them and the first lens group G1 becomes narrow from the wide-angle end to the telephoto end.

Upon focusing from infinity to point-blank range, the rear unit Gr of the first lens group G1 moves toward the object side while the space between it and the front unit Gf becomes narrow.

In order from the object side, the front unit Gf in the first lens group G1 is made up of a first lens that is a negative meniscus lens convex on its object side and a second lens that is a negative meniscus lens convex on its object side, and the rear unit Gr in the first lens group G1 is made up of a third lens that is a plano-concave lens concave on its image side, a third lens that is a plano-concave lens, a fourth lens that is a double-concave negative lens and a fifth lens that is a double-convex positive lens.

The second lens group G2 is made up of a cemented lens of a double-convex positive lens and a double-concave negative lens, a cemented lens of a double-convex positive lens, a double-concave negative lens and a double-convex positive lens, a cemented lens of a double-convex positive lens and a double-concave negative lens, and a double-convex positive lens.

Six aspheric surfaces are used: two at both surfaces of the first lens and two at both surfaces of the second lens in the front unit Gf in the first lens group G1, and two at both surfaces of the double-convex positive lens in the second lens group G2.

Figure 2:
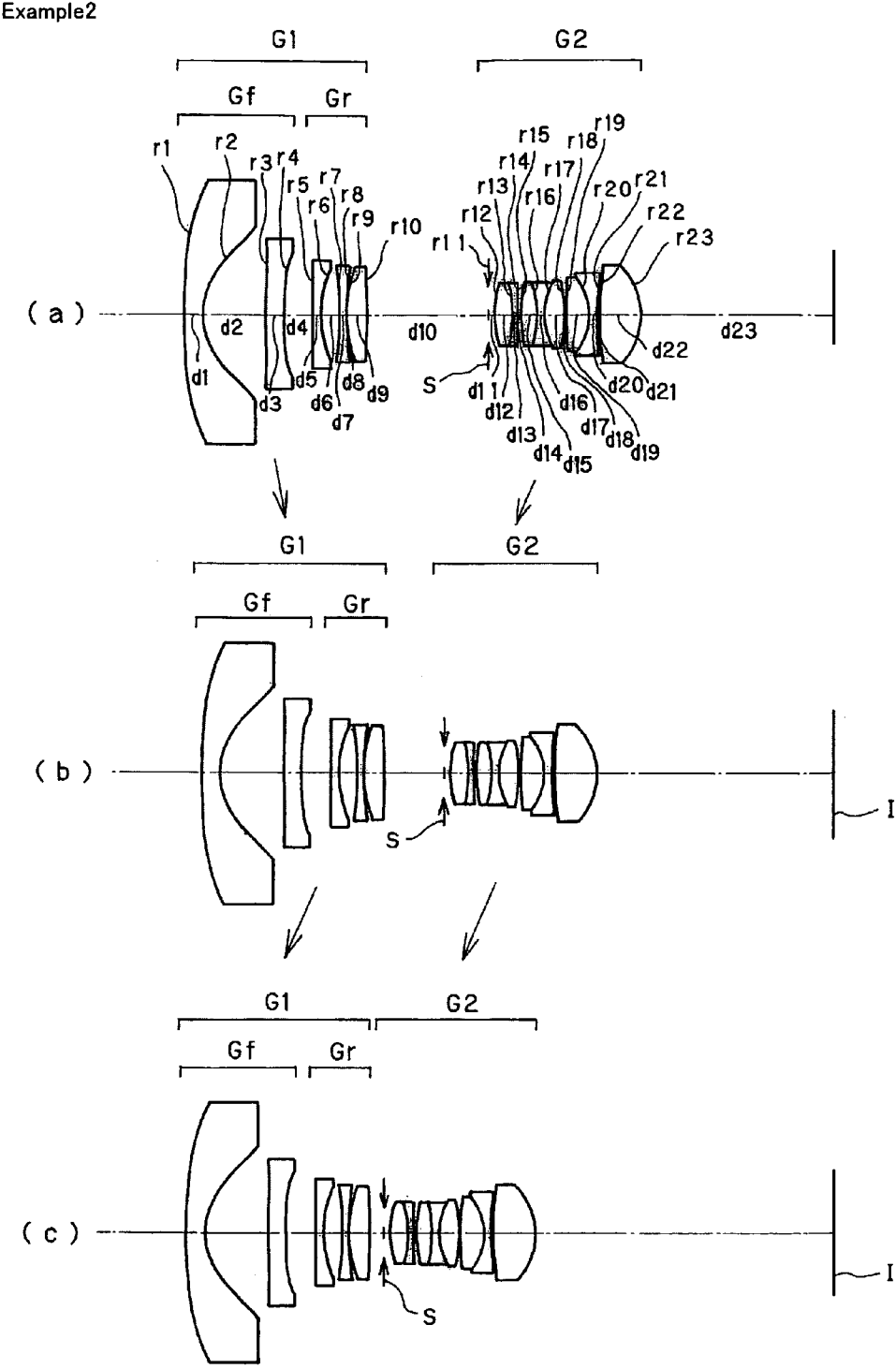
FIG. 2 is illustrative, as in FIG. 1, of Example 2 of the inventive zoom lens.

As shown in FIG. 2, the zoom lens of Example 2 is made up of, in order from its object side, the first lens group G1 of negative refracting power, the aperture stop S, and the second lens group G2 of positive refracting power, and the first lens group is made up of, in order from its object side, the front unit Gf of negative refracting power and the rear unit Gr of negative refracting power.

Upon zooming from the wide-angle end to the telephoto end, the respective lens groups move as follows.

The first lens group G1 moves toward the image side while the space between it and the second lens group G2 becomes narrow from the wide-angle end to the intermediate setting, and moves toward the object side while the space between it and the second lens group G2 becomes narrow from the intermediate setting to the telephoto end. At the telephoto end, the first lens group G1 is positioned a little more on the image side than at the wide-angle end.

The aperture stop S and the second lens group G2 move toward the object side while the space between them and the first lens group G1 becomes narrow from the wide-angle end to the telephoto end.

Upon focusing from infinity to point-blank range, the rear unit Gr in the first lens group G1 moves toward the object side while the space between it and the front unit Gf becomes narrow.

In order from the object side, the front unit Gf in the first lens group G1 is made up of a first lens that is a negative meniscus lens convex on its object side and a second lens that is a negative meniscus lens convex on its object side, and the rear unit Gr in the first lens group G1 is made up of a third lens that is a plano-concave lens concave on its image side, a fourth lens that is a double-concave negative lens and a fifth lens that is a double-convex positive lens.

The second lens group G2 is made up of a cemented lens of a double-convex positive lens and a double-concave negative lens, a cemented lens of a double-convex positive lens, a double-concave negative lens and a double-convex positive lens, a cemented lens of a double-convex positive lens and a double-concave negative lens, and a double-convex positive lens.

Six aspheric surfaces are used: two at both surfaces of the first lens and two at both surfaces of the second lens in the front unit Gf in the first lens group G1, and two at both surfaces of the double-convex positive lens in the second lens group G2.

Figure 3:
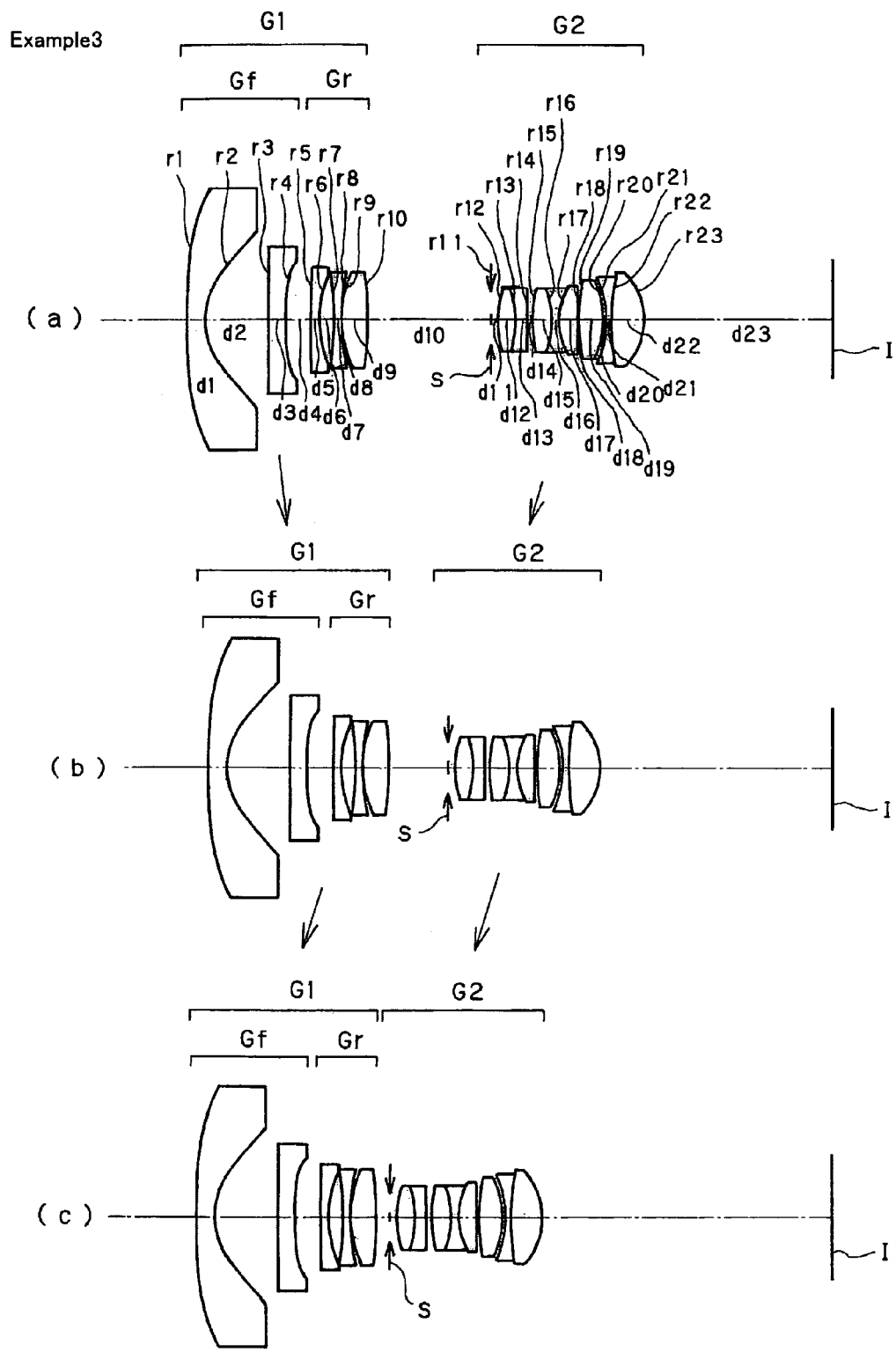
FIG. 3 is illustrative, as in FIG. 1, of Example 3 of the inventive zoom lens.

As shown in FIG. 3, the zoom lens of Example 3 is made up of, in order from its object side, the first lens group G1 of negative refracting power, the aperture stop S, and the second lens group G2 of positive refracting power, and the first lens group is made up of, in order from its object side, the front unit Gf of negative refracting power and the rear unit Gr of negative refracting power.

Upon zooming from the wide-angle end to the telephoto end, the respective lens groups move as follows.

The first lens group G1 moves toward the image side while the space between it and the second lens group G2 becomes narrow from the wide-angle end to the intermediate setting, and moves toward the object side while the space between it and the second lens group G2 becomes narrow from the intermediate setting to the telephoto end. At the telephoto end, the first lens group G1 is positioned a little more on the image side than at the wide-angle end.

The aperture stop S and the second lens group G2 move toward the object side while the space between them and the first lens group G1 becomes narrow from the wide-angle end to the telephoto end.

Upon focusing from infinity to point-blank range, the rear unit Gr of the first lens group G1 moves toward the object side while the space between it and the front unit Gf becomes narrow.

In order from the object side, the front unit Gf in the first lens group G1 is made up of a first lens that is a negative meniscus lens convex on its object side and a second lens that is a negative meniscus lens convex on its object side, and the rear unit Gr in the first lens group G1 is made up of a third lens that is a negative meniscus lens convex on its object side, a fourth lens that is a double-concave negative lens and a fifth lens that is a double-convex positive lens.

The second lens group G2 is made up of a cemented lens of a double-convex positive lens and a double-concave negative lens, a cemented lens of a double-convex positive lens, a double-concave negative lens and a double-convex positive lens, a double-convex positive lens, and a cemented lens of a double-concave negative lens and a double-convex positive lens.

Six aspheric surfaces are used: two at both surfaces of the first lens and two at both surfaces of the second lens in the front unit Gf in the first lens group G1, and two at both surfaces of the double-convex positive lens in the second lens group G2.

Figure 4:
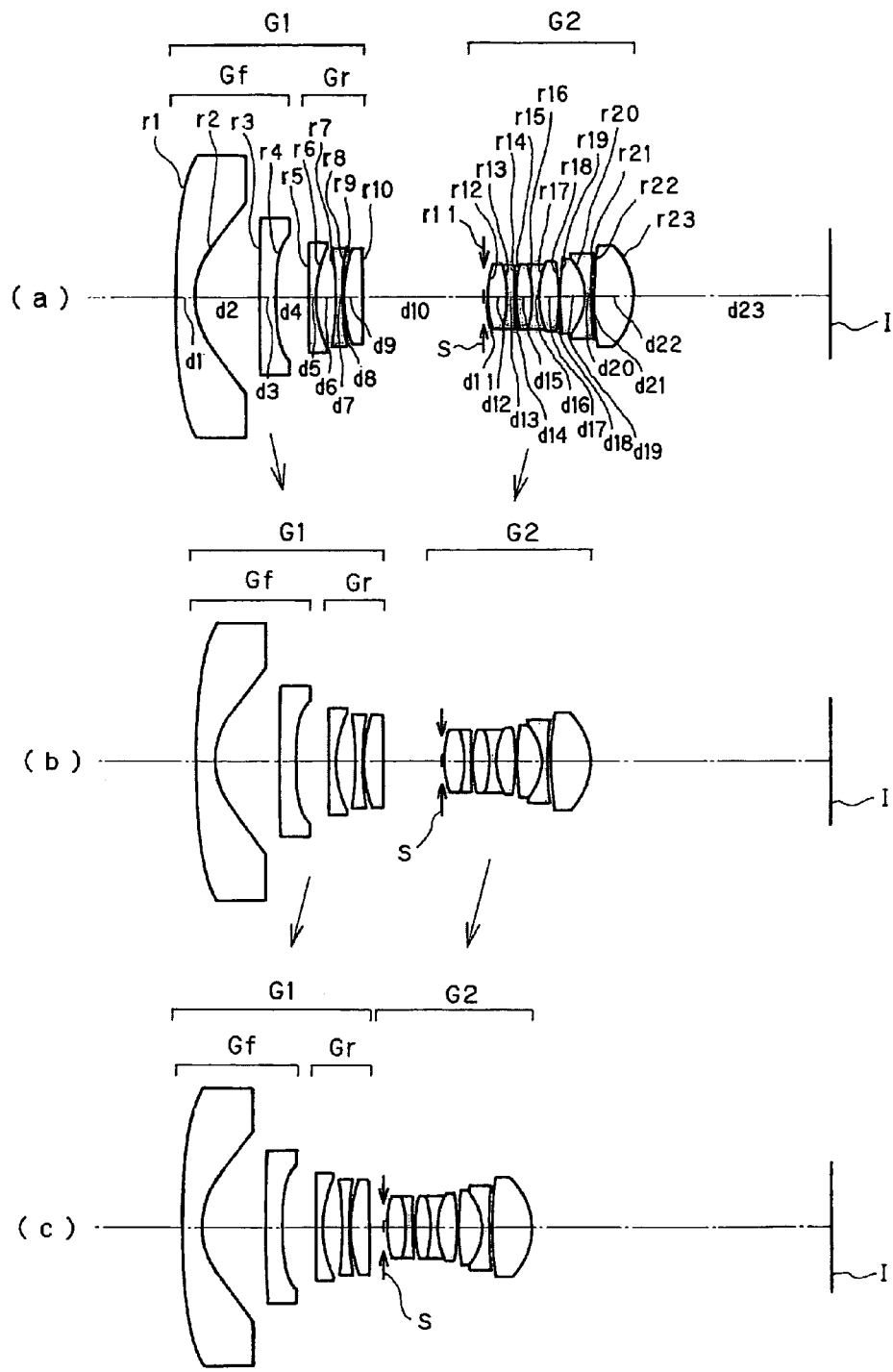
FIG. 4 is illustrative, as in FIG. 1, of Example 4 of the inventive zoom lens.

As shown in FIG. 4, the zoom lens of Example 4 is made up of, in order from its object side, the first lens group G1 of negative refracting power, the aperture stop S, and the second lens group G2 of positive refracting power, and the first lens group is made up of, in order from its object side, the front unit Gf of negative refracting power and the rear unit Gr of negative refracting power.

Upon zooming from the wide-angle end to the telephoto end, the respective lens groups move as follows.

The first lens group G1 moves toward the image side while the space between it and the second lens group G2 becomes narrow from the wide-angle end to the intermediate setting, and moves toward the object side while the space between it and the second lens group G2 becomes narrow from the intermediate setting to the telephoto end. At the telephoto end, the first lens group Gt is positioned a little more on the image side than at the wide-angle end.

The aperture stop S and the second lens group G2 move toward the object side while the space between them and the first lens group G1 becomes narrow from the wide-angle end to the telephoto end.

Upon focusing from infinity to point-blank range, the rear unit Gr in the first lens group G1 moves toward the object side while the space between it and the front unit Gf becomes narrow.

In order from the object side, the front unit Gf in the first lens group G1 is made up of a first lens that is a negative meniscus lens convex on its object side and a second lens that is a negative meniscus lens convex on its object side, and the rear unit Gr in the first lens group G1 is made up of a third lens that is a negative meniscus lens concave on its image side, a fourth lens that is a double-concave negative lens and a fifth lens that is a double-convex positive lens.

The second lens group G2 is made up of a cemented lens of a double-convex positive lens and a double-concave negative lens, a cemented lens of a double-convex positive lens, a double-concave negative lens and a double-convex positive lens, a cemented lens of a double-convex positive lens and a double-concave negative lens, and a double-convex positive lens.

Six aspheric surfaces are used: two at both surfaces of the first lens and two at both surfaces of the second lens in the front unit Gf in the first lens group G1, and two at both surfaces of the double-convex positive lens in the second lens group G2.

Set out below are numerical data on the lenses in each examples.

Referring here to the numerical data on the lenses in each example, r is the radius of curvature of each lens surface, d is the thickness or spacing of each lens, nd is the d-line refractive index of each lens, νd is the d-line Abbe constant of each lens, K is the conic coefficient, A4, A6, A8, A10 and A12 are the aspheric coefficients, and E±N is $\times 10^{\pm N}$, with DO indicative of a spacing from the subject to the first surface.

Using each respective aspheric coefficient in each example, each aspheric configuration is given by the following equation:

$$Z=(Y^2/r)/[1+\{1-(1+K)\cdot(Y/r)^2\}^{1/2}]+A4\times Y^4+A6\times Y^6+A8\times Y^8+A10\times Y^{10}+A12\times Y^{12}$$

where Z is the coordinates in the optical axis direction, and Y is the coordinates in the direction vertical to the optical axis.

The values of the conditions in each embodiment are the ones measured upon focusing on an object point at infinity. Full length is the on-axis distance from the entrance surface to the exit surface of the lens arrangement plus back focus, and the back focus is given on an air basis.

Numerical Example 1
Unit mm

Surface data

| Surface number | r | d | nd | νd |
|---|---|---|---|---|
| 1(Aspheric) | 232.63 | 3.20 | 1.58250 | 59.30 |
| 2(Aspheric) | 11.38 | 11.00 | | |
| 3(Aspheric) | 122.76 | 3.00 | 1.52540 | 55.80 |
| 4(Aspheric) | 110.50 | Variable | | |
| 5 | ∞ | 1.30 | 1.60310 | 60.60 |
| 6 | 21.000 | 3.10 | | |
| 7 | −63.640 | 1.20 | 1.58910 | 61.10 |
| 8 | 49.090 | 0.20 | | |
| 9 | 23.920 | 3.40 | 1.68890 | 31.10 |
| 10 | −259.960 | Variable | | |
| 11(Stop) | ∞ | 0.70 | | |
| 12 | 16.480 | 3.60 | 1.60340 | 38.00 |
| 13 | −21.160 | 1.00 | 1.48750 | 70.20 |
| 14 | 257.160 | 0.40 | | |
| 15 | 27.350 | 2.70 | 1.48750 | 70.20 |
| 16 | −20.760 | 1.20 | 1.88300 | 40.80 |
| 17 | 12.960 | 3.40 | 1.48750 | 70.20 |
| 18 | −32.220 | 0.20 | | |
| 19 | 55.470 | 4.30 | 1.48750 | 70.20 |
| 20 | −10.170 | 1.20 | 1.78590 | 44.20 |
| 21 | 68.620 | 0.30 | | |
| 22(Aspheric) | 49.37 | 7.40 | 1.49640 | 81.50 |
| 23(Aspheric) | −12.38 | Variable | | |
| Image plane | ∞ | | | |

Aspheric data

1st Surface

K = −22.852, A4 = 1.716E−05, A6 = −1.469E−07, A8 = 1.008E−12, A10 = 3.616E−14, A12 = −3.740E−17

2nd Surface

K = −1.295, A4 = 9.699E−06, A6 = 1.551E−07, A8 = −7.650E−10, A10 = 1.535E−12, A12 = −7.121E−15

-continued

3rd Surface

K = 0.000, A4 = −6.960E−05, A6 = 9.700E−08, A8 = 1.970E−09,
A10 = −7.310E−12, A12 = 8.152E−16

4th Surface

K = 0.000, A4 = 8.708E−06, A6 = 1.585E−07, A8 = 4.540E−09,
A10 = −2.818E−11, A12 = 1.659E−13

22th Surface

K = −7.984, A4 = −1.576E−05, A6 = 1.166E−07, A8 = 3.220E−09,
A10 = −2.190E−11, A12 = 0.000E−00

23th Surface

K = −0.182, A4 = 2.108E−05, A6 = 9.429E−08, A8 = −3.360E−10,
A10 = 1.709E−11, A12 = 0.000E−00

Various data

| | wide-angle | intermediate | telephoto |
|---|---|---|---|
| Focal length | 9.165 | 12.709 | 17.655 |
| F-number | 4.14 | 4.82 | 5.71 |
| Angle of view | 102.70 | 82.90 | 64.60 |
| Image height | 11.15 | 11.15 | 11.15 |
| Full lens length | 112.62 | 109.62 | 112.56 |
| (Upon focusing at infinity) | | | |
| D0 | ∞ | ∞ | ∞ |
| D4 | 5.07 | 5.07 | 5.07 |
| D10 | 21.18 | 10.53 | 2.81 |
| D23 | 33.56 | 41.21 | 51.87 |
| (IO: Upon focusing at 400 mm) | | | |
| D0 | 287.64 | 290.66 | 287.70 |
| D4 | 3.71 | 3.71 | 3.71 |
| D10 | 22.28 | 11.62 | 3.91 |
| D23 | 33.56 | 41.21 | 51.87 |
| (IO: Upon focusing at 250 mm) | | | |
| D0 | 137.78 | 140.81 | 137.84 |
| D4 | 2.53 | 2.53 | 2.53 |
| D10 | 23.32 | 12.65 | 4.95 |
| D23 | 33.56 | 41.21 | 51.87 |

Data on zoom lens group

| Group | Start surface | Focal length |
|---|---|---|
| 1 | 1 | −12.483 |
| 2 | 12 | 27.483 |

Numerical Example 2
Unit mm

Surface data

| Surface number | r | d | nd | νd |
|---|---|---|---|---|
| 1(Aspheric) | 254.51 | 3.20 | 1.58310 | 59.40 |
| 2(Aspheric) | 11.31 | 11.00 | | |
| 3(Aspheric) | 102.36 | 3.00 | 1.52540 | 55.80 |
| 4(Aspheric) | 137.21 | Variable | | |
| 5 | ∞ | 1.30 | 1.60310 | 60.60 |
| 6 | 19.940 | 3.30 | | |
| 7 | −67.950 | 1.20 | 1.60310 | 60.60 |
| 8 | 51.370 | 0.10 | | |
| 9 | 23.520 | 3.50 | 1.68890 | 31.10 |
| 10 | −318.080 | Variable | | |
| 11(Stop) | ∞ | 0.70 | | |
| 12 | 16.250 | 3.30 | 1.60340 | 38.00 |
| 13 | −20.740 | 1.00 | 1.48750 | 70.20 |
| 14 | 235.140 | 0.40 | | |
| 15 | 26.130 | 2.80 | 1.48750 | 70.20 |
| 16 | −20.500 | 1.20 | 1.88300 | 40.80 |
| 17 | 12.410 | 3.50 | 1.48750 | 70.20 |
| 18 | −33.250 | 0.20 | | |
| 19 | 56.070 | 4.30 | 1.48750 | 70.20 |
| 20 | −10.220 | 1.20 | 1.78590 | 44.20 |
| 21 | 66.600 | 0.30 | | |
| 22(Aspheric) | 51.13 | 7.30 | 1.49700 | 81.50 |
| 23(Aspheric) | −12.25 | Variable | | |
| Image plane | ∞ | | | |

Aspheric data

1st Surface

K = 0.000, A4 = 1.365E−05, A6 = −1.136E−08, A8 = 3.949E−12,
A10 = 1.589E−14, A12 = −1.508E−17

2nd Surface

K = −1.320, A4 = 9.964E−06, A6 = 5.843E−08, A8 = −7.707E−12,
A10 = −1.816E−12, A12 = 0.000E−00

3rd Surface

K = 0.000, A4 = −5.678E−05, A6 = 1.656E−07, A8 = 7.063E−10,
A10 = −3.993E−12, A12 = 0.000E−00

4th Surface

K = 0.000, A4 = 1.859E−05, A6 = 2.852E−07, A8 = 6.979E−10,
A10 = 6.880E−12, A12 = 0.000E−00

22th Surface

K = −5.090, A4 = −2.372E−05, A6 = 1.382E−07, A8 = 1.285E−09,
A10 = −8.015E−12, A12 = 0.000E−00

23th Surface

K = −0.450, A4 = 1.176E−06, A6 = 7.896E−10, A8 = −9.559E−10,
A10 = 9.801E−12, A12 = 0.000E−00

Various data

| | wide-angle | intermediate | telephoto |
|---|---|---|---|
| Focal length | 9.151 | 12.712 | 17.662 |
| F-number | 4.08 | 4.82 | 5.72 |
| Angle of view | 102.80 | 83.00 | 64.60 |
| Image height | 11.15 | 11.15 | 11.15 |
| Full lens length | 112.69 | 109.46 | 112.23 |
| (Upon focusing at infinity) | | | |
| D0 | ∞ | ∞ | ∞ |
| D4 | 5.05 | 5.05 | 5.05 |
| D10 | 21.44 | 10.60 | 2.80 |
| D23 | 33.53 | 41.14 | 51.72 |
| (IO: Upon focusing at 400 mm) | | | |
| D0 | 287.58 | 290.82 | 288.04 |
| D4 | 3.73 | 3.73 | 3.73 |
| D10 | 22.50 | 11.65 | 3.85 |
| D23 | 33.53 | 41.14 | 51.72 |
| (IO: Upon focusing at 250 mm) | | | |
| D0 | 137.71 | 140.96 | 138.16 |
| D4 | 2.61 | 2.61 | 2.61 |
| D10 | 23.49 | 12.63 | 4.85 |
| D23 | 33.53 | 41.14 | 51.72 |

Data on zoom lens group

| Group | Start surface | Focal length |
|---|---|---|
| 1 | 1 | −12.871 |
| 2 | 12 | 27.502 |

Numerical Example 3
Unit mm

Surface data

| Surface number | r | d | nd | νd |
|---|---|---|---|---|
| 1(Aspheric) | 266.41 | 3.20 | 1.58310 | 59.40 |
| 2(Aspheric) | 11.68 | 11.20 | | |

-continued

| | | | | |
|---|---|---|---|---|
| 3(Aspheric) | 110.34 | 3.00 | 1.52540 | 55.80 |
| 4(Aspheric) | 100.84 | Variable | | |
| 5 | 317.850 | 1.20 | 1.60310 | 60.60 |
| 6 | 19.560 | 2.90 | | |
| 7 | −47.750 | 1.10 | 1.60310 | 60.60 |
| 8 | 37.850 | 0.20 | | |
| 9 | 21.880 | 4.50 | 1.63980 | 34.50 |
| 10 | −68.080 | Variable | | |
| 11(Stop) | ∞ | 1.20 | | |
| 12 | 17.270 | 3.30 | 1.57500 | 41.50 |
| 13 | −18.410 | 2.00 | 1.48750 | 70.20 |
| 14 | 428.680 | 0.80 | | |
| 15 | 24.830 | 3.70 | 1.51630 | 64.10 |
| 16 | −14.630 | 1.20 | 1.88300 | 40.80 |
| 17 | 11.310 | 3.40 | 1.48750 | 70.20 |
| 18 | −158.960 | 0.20 | | |
| 19(Aspheric) | 34.27 | 4.30 | 1.49640 | 81.50 |
| 20(Aspheric) | −16.14 | 0.40 | | |
| 21 | −21.070 | 1.00 | 1.81600 | 46.60 |
| 22 | 47.870 | 5.70 | 1.48750 | 70.20 |
| 23 | −12.510 | Variable | | |
| Image plane | ∞ | | | |

Aspheric data

1st Surface

K = 92.742, A4 = 9.961E−06, A6 = −4.189E−09, A8 = 1.708E−12, A10 = 3.195E−15, A12 = −8.084E−18

2nd Surface

K = −1.312, A4 = −2.870E−07, A6 = 1.001E−08, A8 = −3.825E−11, A10 = 2.327E−13, A12 = −3.265E−15

3rd Surface

K = 0.000, A4 = −8.405E−05, A6 = 4.895E−07, A8 = −4.181E−11, A10 = −4.410E−12, A12 = 0.000E−00

4th Surface

K = 0.000, A4 = −5.250E−08, A6 = 8.808E−07, A8 = 2.746E−09, A10 = 2.641E−11, A12 = 0.000E−00

19th Surface

K = 0.000, A4 = 4.839E−06, A6 = 8.160E−08, A8 = 2.152E−09, A10 = −5.264E−11, A12 = 0.000E−00

20th Surface

K = 0.000, A4 = 8.345E−05, A6 = 1.723E−08, A8 = 2.143E−09, A10 = −6.931E−11, A12 = 0.000E−00

Various data

| | wide-angle | intermediate | telephoto |
|---|---|---|---|
| Focal length | 9.170 | 12.750 | 17.720 |
| F-number | 4.07 | 4.82 | 5.71 |
| Angle of view | 102.80 | 83.20 | 64.70 |
| Image height | 11.15 | 11.15 | 11.15 |
| Full lens length | 114.61 | 110.66 | 112.88 |
| (Upon focusing at infinity) | | | |
| D0 | ∞ | ∞ | ∞ |
| D4 | 4.55 | 4.55 | 4.55 |
| D10 | 21.99 | 10.51 | 2.26 |
| D23 | 33.57 | 41.10 | 51.57 |
| (IO: Upon focusing at 400 mm) | | | |
| D0 | 285.39 | 289.34 | 287.12 |
| D4 | 3.51 | 3.52 | 3.52 |
| D10 | 22.28 | 11.62 | 3.91 |
| D23 | 33.56 | 41.21 | 51.87 |
| (IO: Upon focusing at 250 mm) | | | |
| D0 | 135.39 | 139.34 | 137.12 |
| D4 | 2.42 | 2.48 | 2.45 |
| D10 | 24.12 | 12.58 | 4.46 |
| D23 | 33.57 | 41.10 | 51.57 |

-continued

Data on zoom lens group

| Group | Start surface | Focal length |
|---|---|---|
| 1 | 1 | −13.345 |
| 2 | 12 | 28.099 |

Numerical Example 4
Unit mm

Surface data

| Surface number | r | d | nd | vd |
|---|---|---|---|---|
| 1(Aspheric) | 325.73 | 3.20 | 1.58300 | 59.40 |
| 2(Aspheric) | 11.63 | 10.90 | | |
| 3(Aspheric) | 140.43 | 2.80 | 1.52540 | 55.80 |
| 4(Aspheric) | 97.75 | Variable | | |
| 5 | ∞ | 1.30 | 1.61800 | 63.30 |
| 6 | 20.280 | 3.40 | | |
| 7 | −70.550 | 1.20 | 1.61800 | 63.30 |
| 8 | 50.380 | 0.20 | | |
| 9 | 23.560 | 3.60 | 1.69900 | 30.10 |
| 10 | −277.890 | Variable | | |
| 11(Stop) | ∞ | 0.50 | | |
| 12 | 16.680 | 3.50 | 1.60340 | 38.00 |
| 13 | −20.930 | 1.20 | 1.48750 | 70.20 |
| 14 | 239.150 | 0.40 | | |
| 15 | 26.910 | 2.70 | 1.48750 | 70.20 |
| 16 | −19.280 | 1.20 | 1.88300 | 40.80 |
| 17 | 12.770 | 3.40 | 1.48750 | 70.20 |
| 18 | −32.900 | 0.20 | | |
| 19 | 53.800 | 4.40 | 1.48750 | 70.20 |
| 20 | −10.060 | 1.00 | 1.78590 | 44.20 |
| 21 | 65.760 | 0.40 | | |
| 22(Aspheric) | 47.73 | 6.90 | 1.49640 | 81.50 |
| 23(Aspheric) | −11.64 | Variable | | |
| Image plane | ∞ | | | |

Aspheric data

1st Surface

K = −22.229, A4 = 7.172E−06, A6 = −2.218E−09, A8 = 5.137E−12, A10 = 6.362E−16, A12 = −4.101E−18

2nd Surface

K = −1.514, A4 = 2.495E−08, A6 = −3.004E−13, A8 = −7.721E−10, A10 = 3.694E−12, A12 = −5.539E−15

3rd Surface

K = −2.521, A4 = −3.026E−05, A6 = 1.304E−07, A8 = 9.276E−11, A10 = −1.120E−12, A12 = 0.000E−00

4th Surface

K = 72.860, A4 = 4.864E−05, A6 = 3.437E−07, A8 = 4.110E−21, A10 = 7.213E−12, A12 = 0.000E−00

22th Surface

K = −16.668, A4 = −9.744E−06, A6 = 1.934E−08, A8 = 4.733E−09, A10 = −3.792E−11, A12 = 0.000E−00

23th Surface

K = −0.461, A4 = 3.035E−06, A6 = −2.859E−08, A8 = −4.364E−10, A10 = 1.102E−11, A12 = 0.000E−00

Various data

| | wide-angle | intermediate | telephoto |
|---|---|---|---|
| Focal length | 8.660 | 12.010 | 16.690 |
| F-number | 4.07 | 4.82 | 5.71 |
| Angle of view | 105.92 | 85.36 | 67.51 |
| Image height | 11.15 | 11.15 | 11.15 |
| Full lens length | 119.98 | 108.58 | 111.06 |
| (Upon focusing at infinity) | | | |
| D0 | ∞ | ∞ | ∞ |
| D4 | 5.66 | 5.66 | 5.66 |

-continued

| | | | |
|---|---|---|---|
| D10 | 20.77 | 10.00 | 2.20 |
| D23 | 33.48 | 40.85 | 51.13 |
| (IO: Upon focusing at 400 mm) | | | |
| D0 | 288.29 | 291.70 | 289.21 |
| D4 | 4.35 | 4.35 | 4.35 |
| D10 | 21.81 | 11.03 | 3.24 |
| D23 | 33.48 | 40.85 | 51.13 |
| (IO: Upon focusing at 250 mm) | | | |
| D0 | 138.42 | 141.85 | 139.35 |
| D4 | 3.24 | 3.24 | 3.24 |
| D10 | 22.79 | 11.99 | 4.21 |
| D23 | 33.48 | 40.85 | 51.13 |

Data on zoom lens group

| Group | Start surface | Focal length |
|---|---|---|
| 1 | 1 | −12.335 |
| 2 | 12 | 27.125 |

Figure 5:
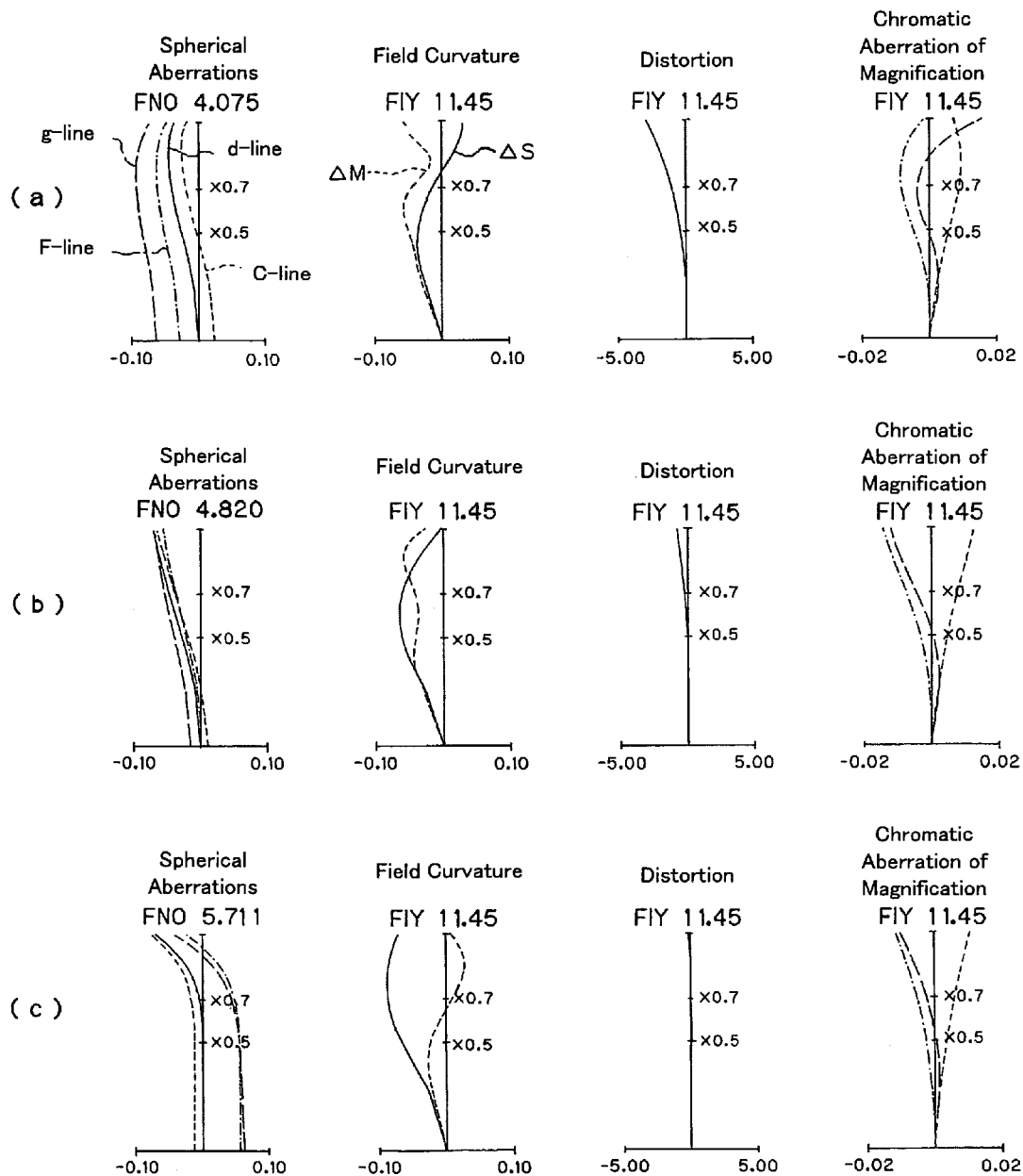
FIG. 5 is an aberration diagram for Example 1 upon focusing on an object point at infinity.
Figure 6:
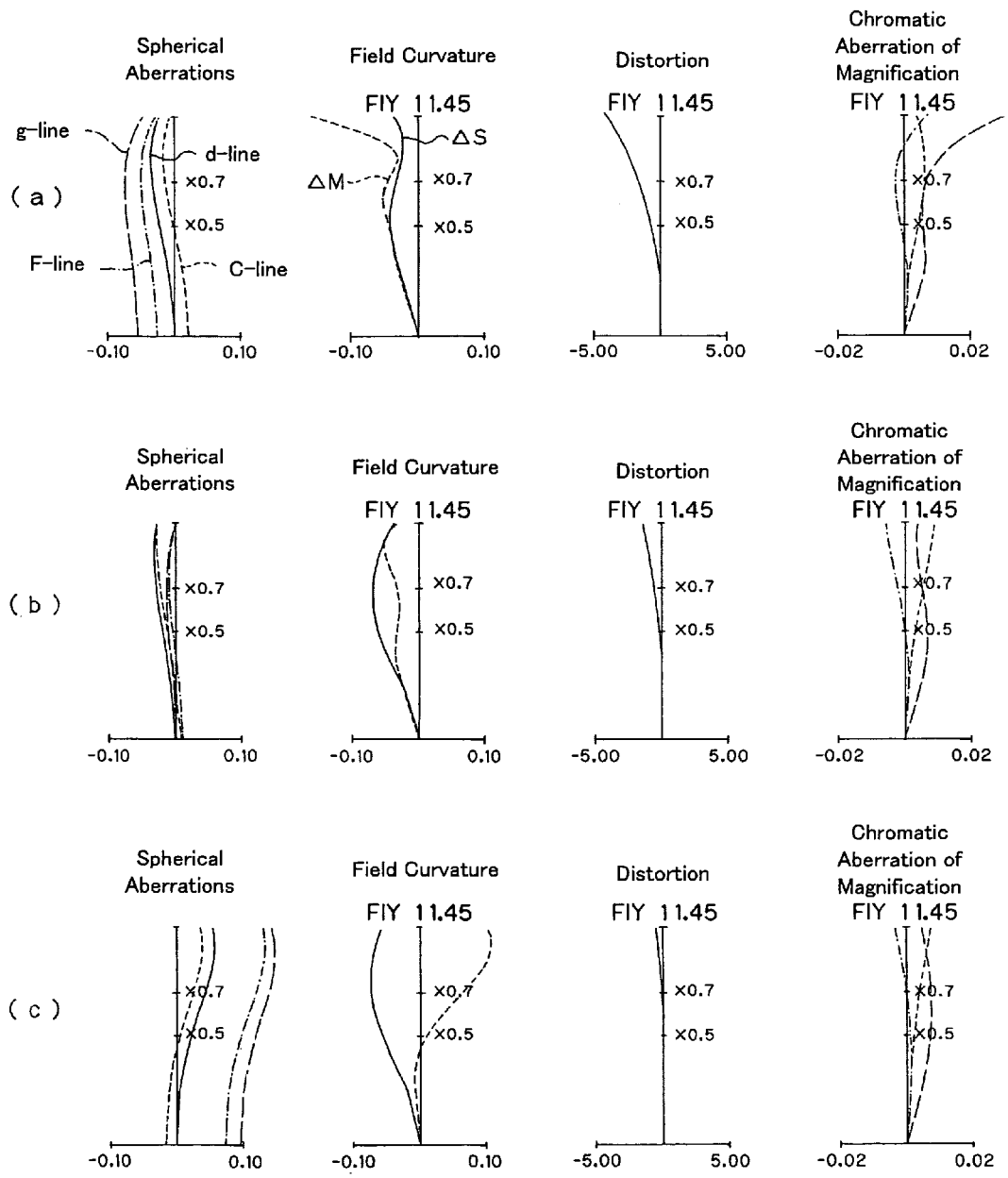
FIG. 6 is an aberration diagram for Example 1 upon focusing at 400 mm.
Figure 7:
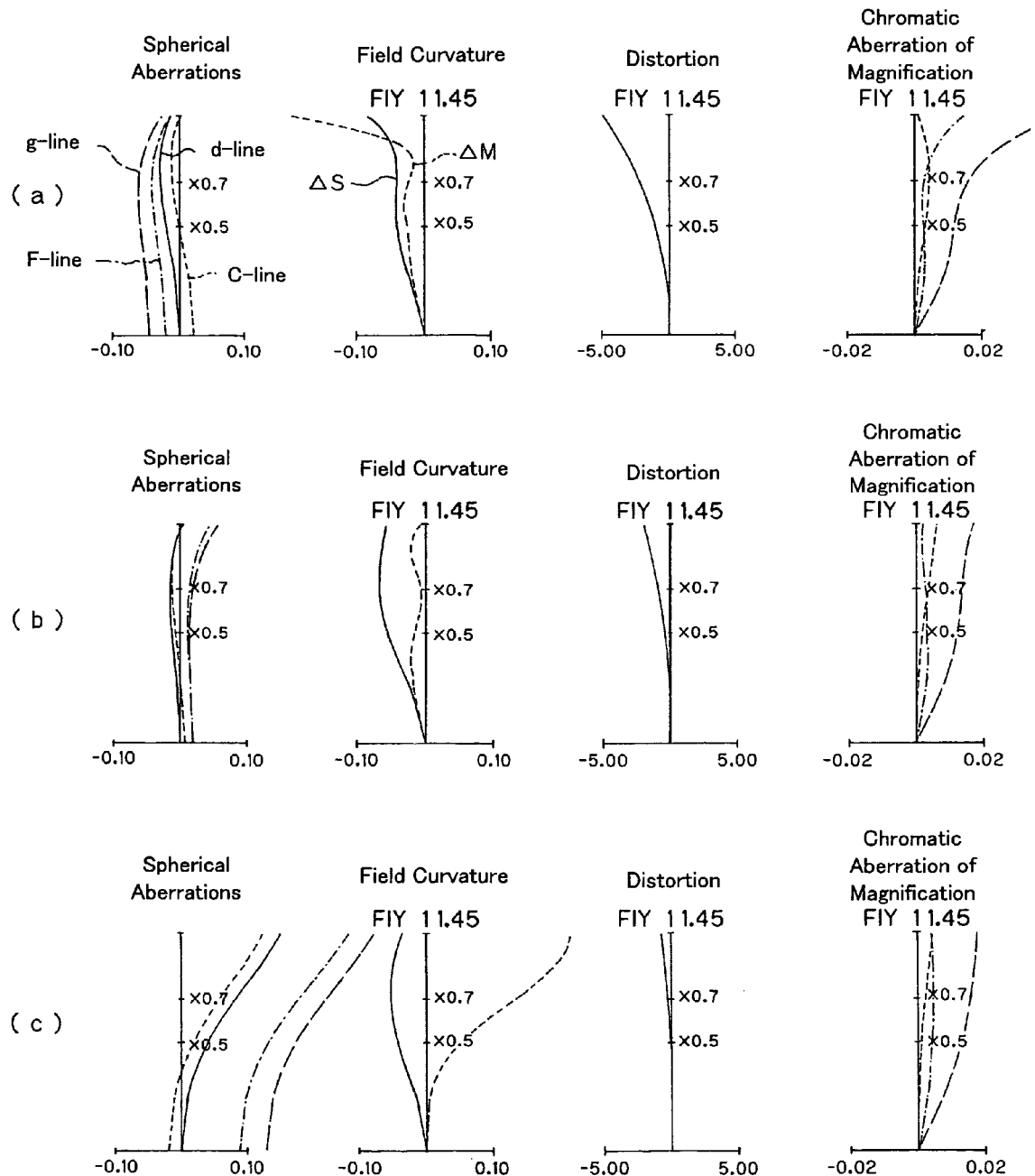
FIG. 7 is an aberration diagram for Example 1 upon focusing at 250 mm.
Figure 8:
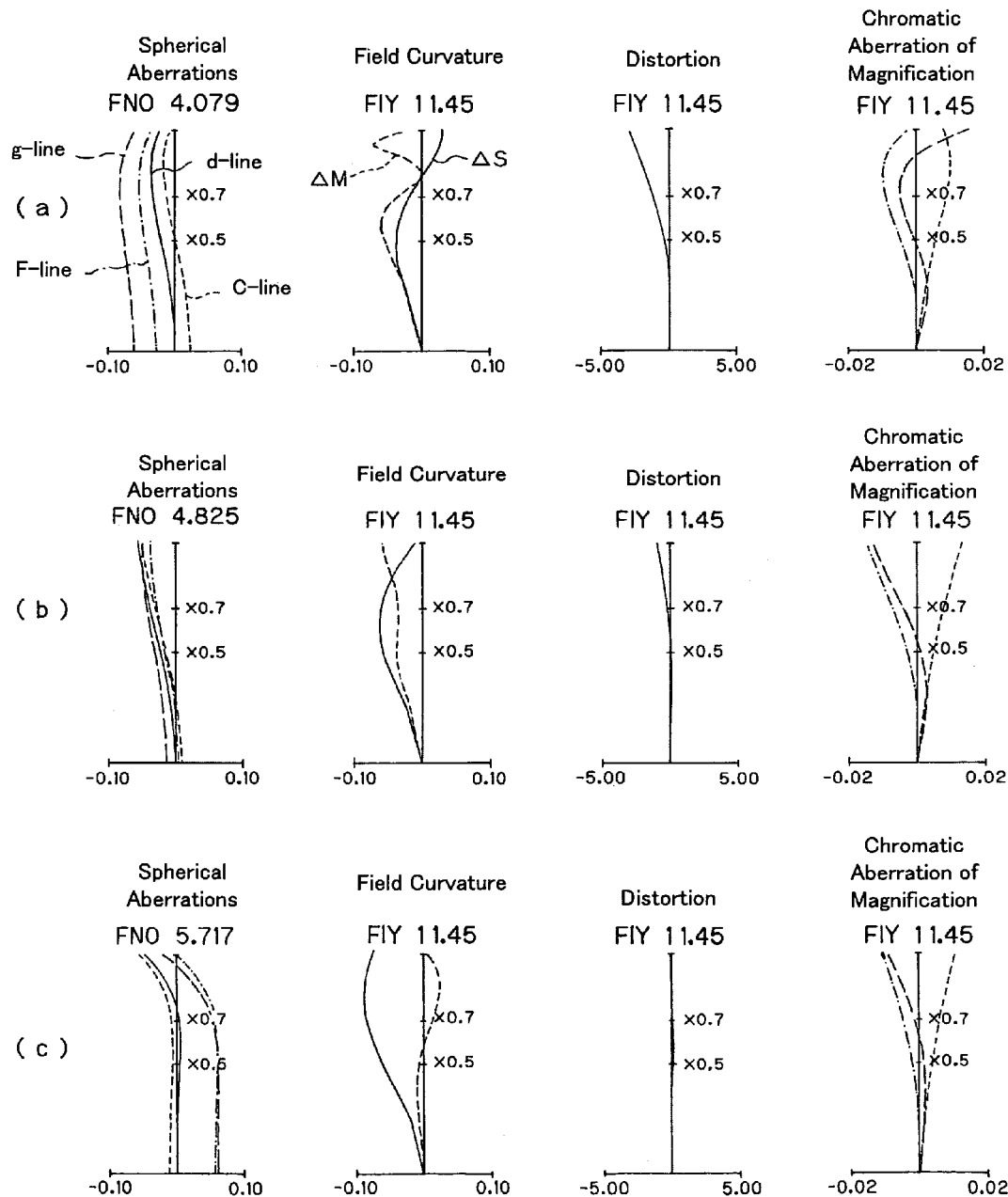
FIG. 8 is an aberration diagram for Example 2 upon focusing on an object point at infinity.
Figure 9:
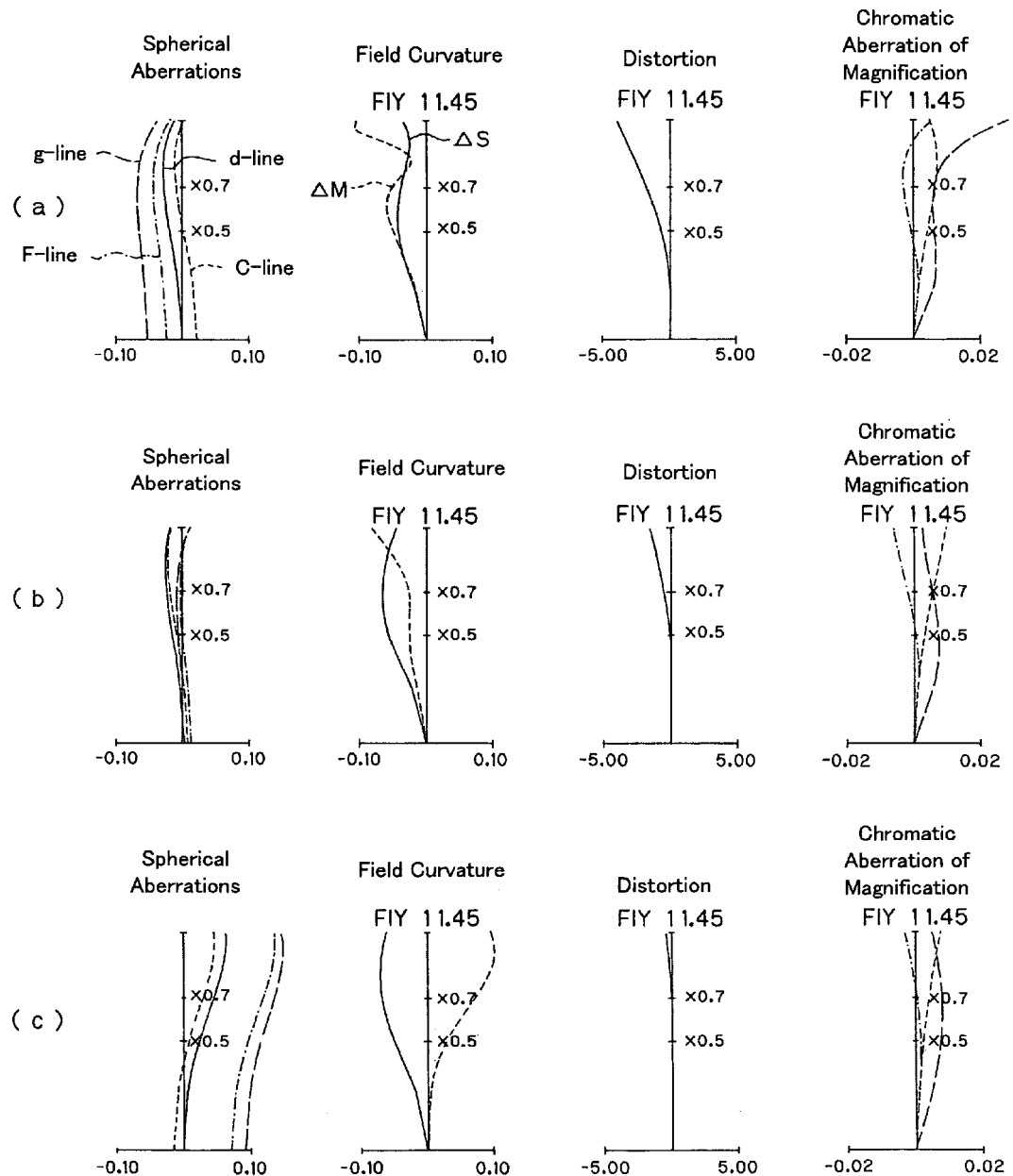
FIG. 9 is an aberration diagram for Example 2 upon focusing at 400 mm.
Figure 10:
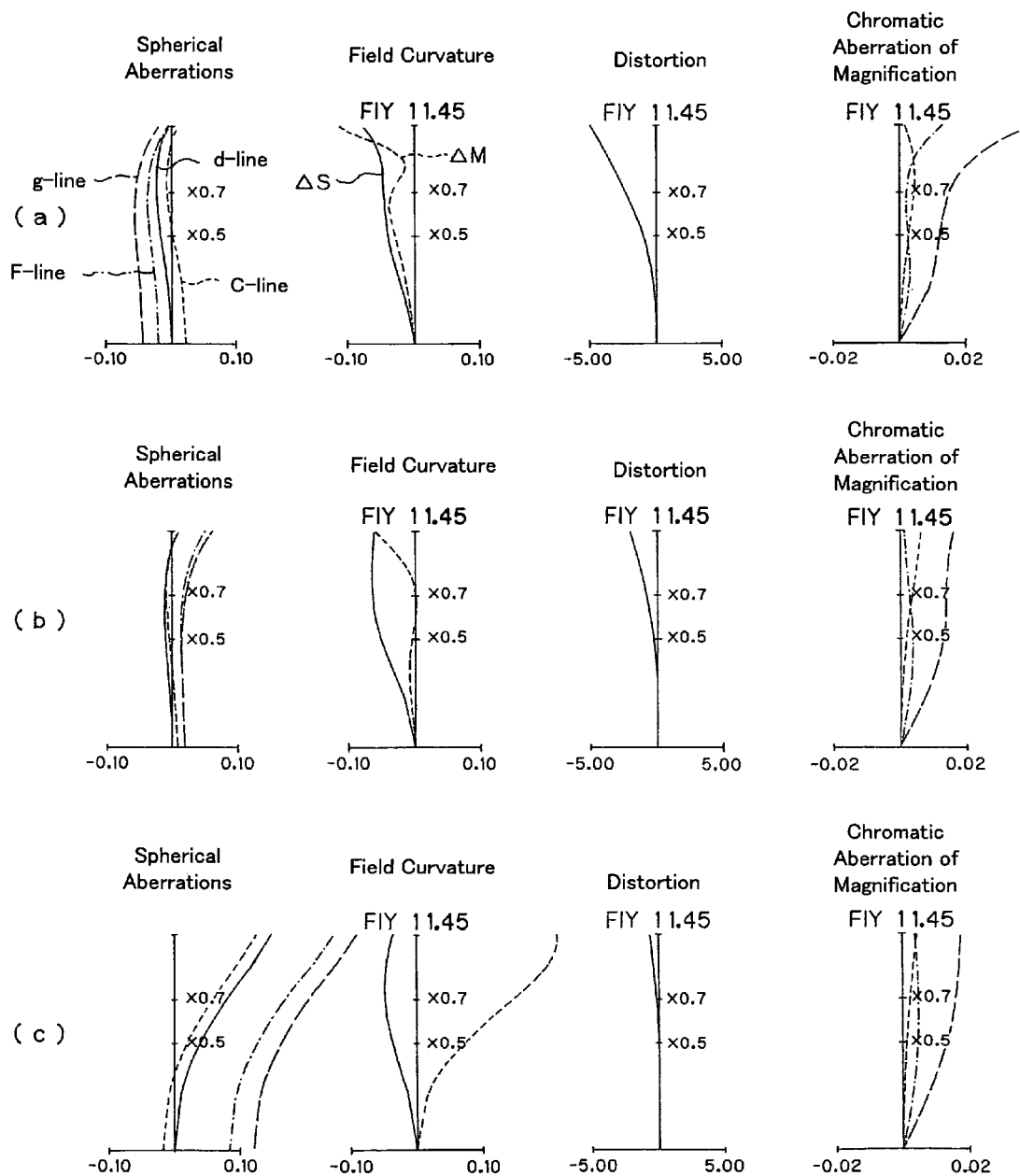
FIG. 10 is an aberration diagram for Example 2 upon focusing at 250 mm.
Figure 11:
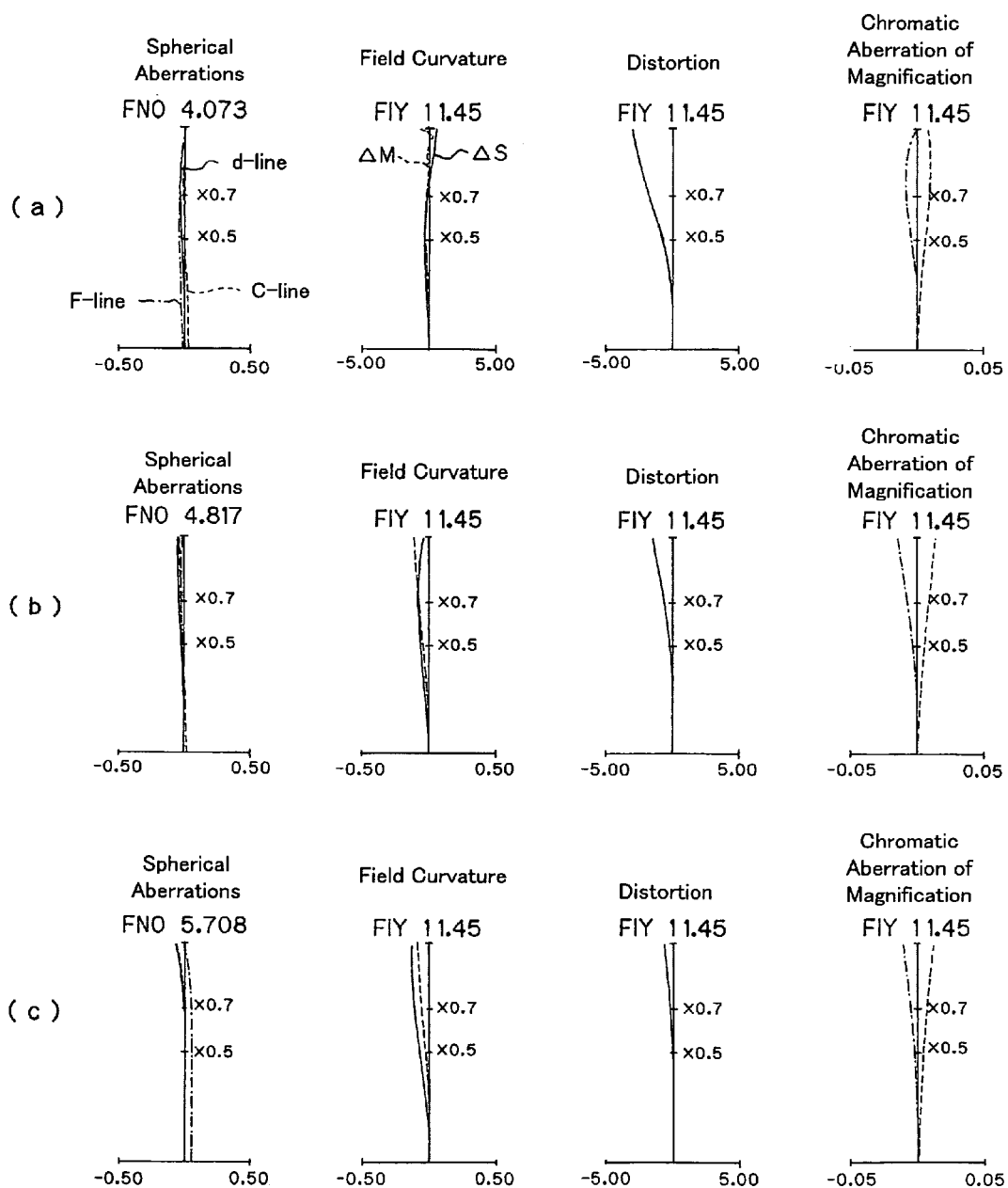
FIG. 11 is an aberration diagram for Example 3 upon focusing on an object point at infinity.
Figure 12:
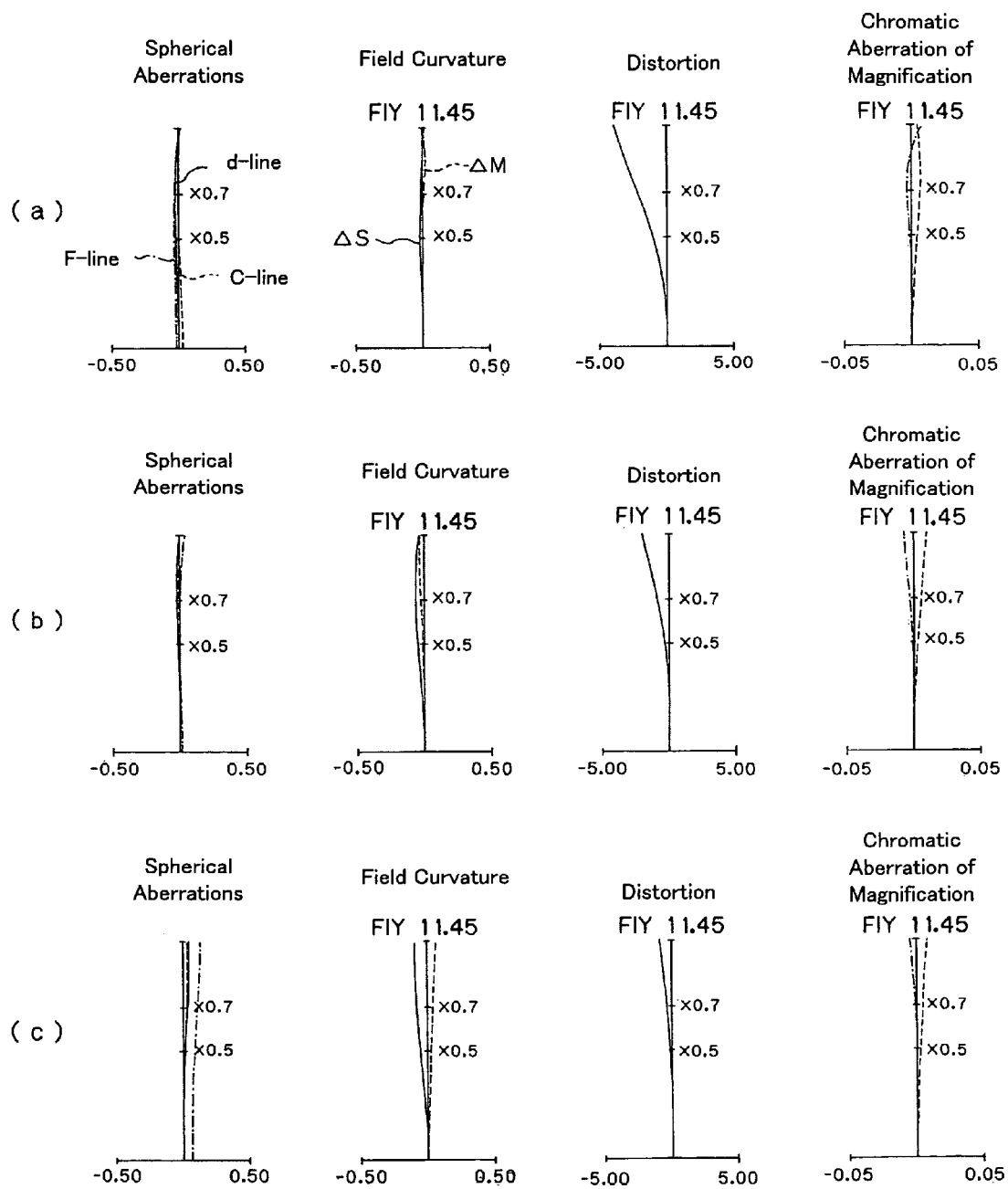
FIG. 12 is an aberration diagram for Example 3 upon focusing at 400 mm.
Figure 13:
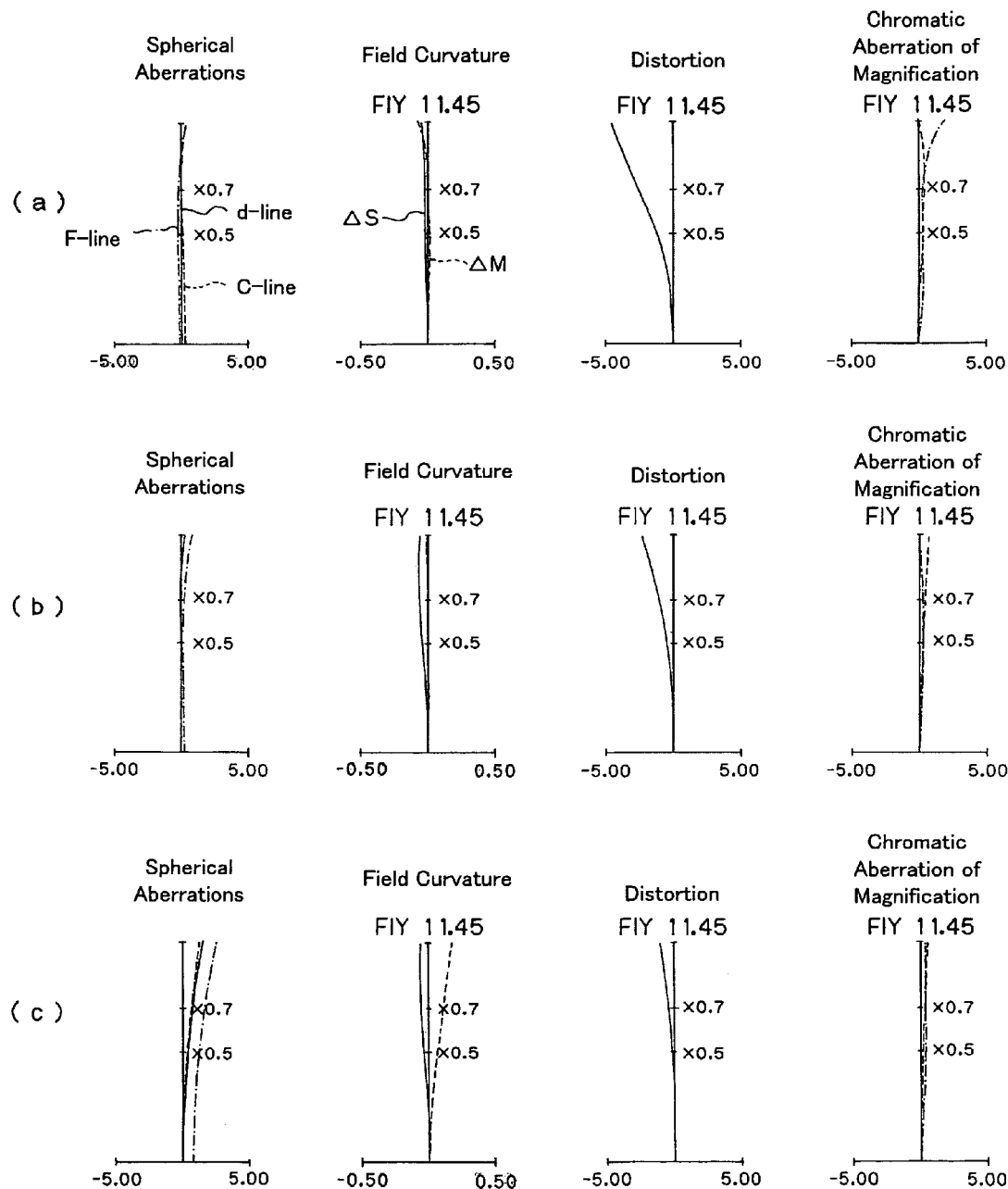
FIG. 13 is an aberration diagram for Example 3 upon focusing at 250 mm.
Figure 14:
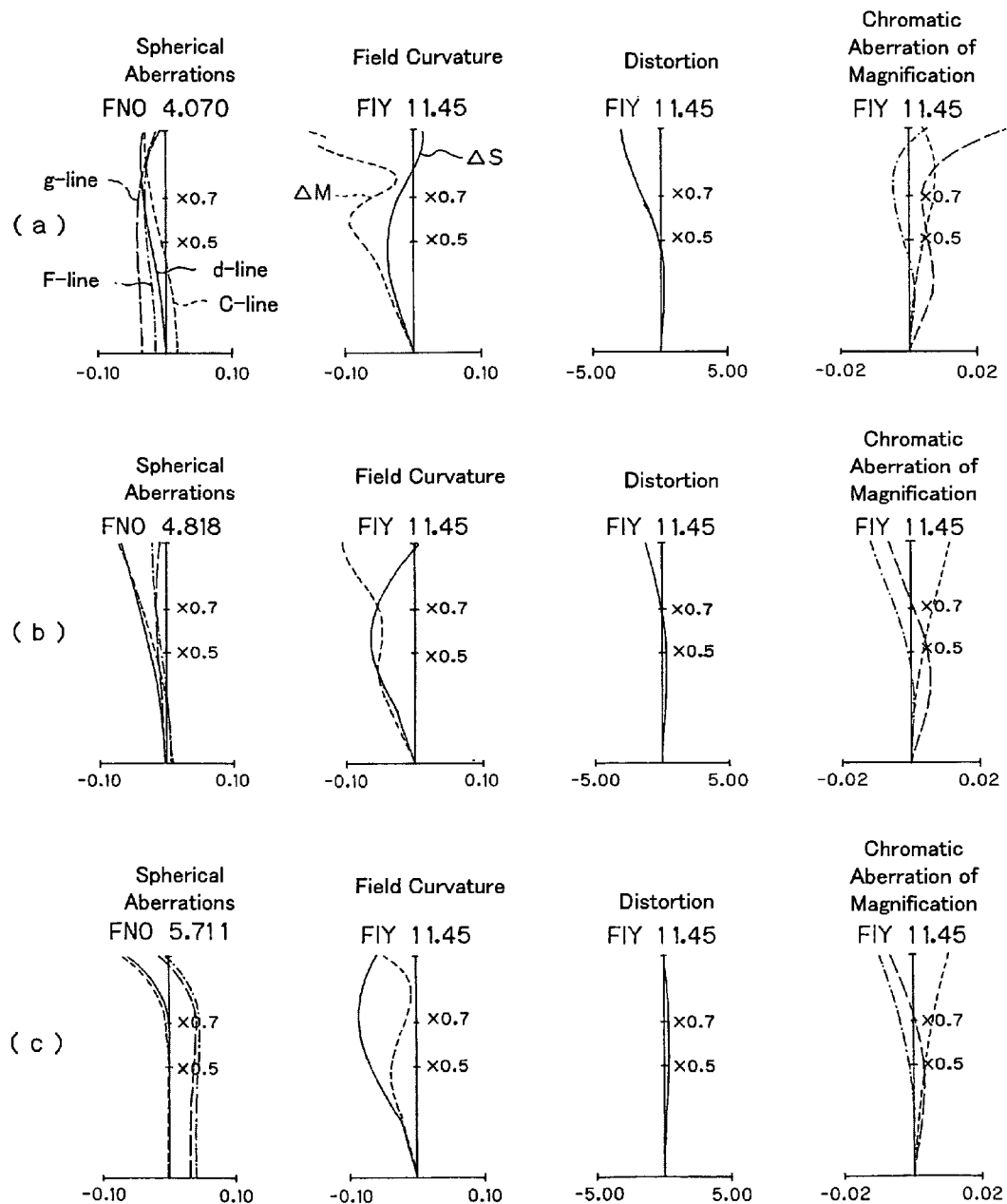
FIG. 14 is an aberration diagram for Example 4 upon focusing on an object point at infinity.
Figure 15:
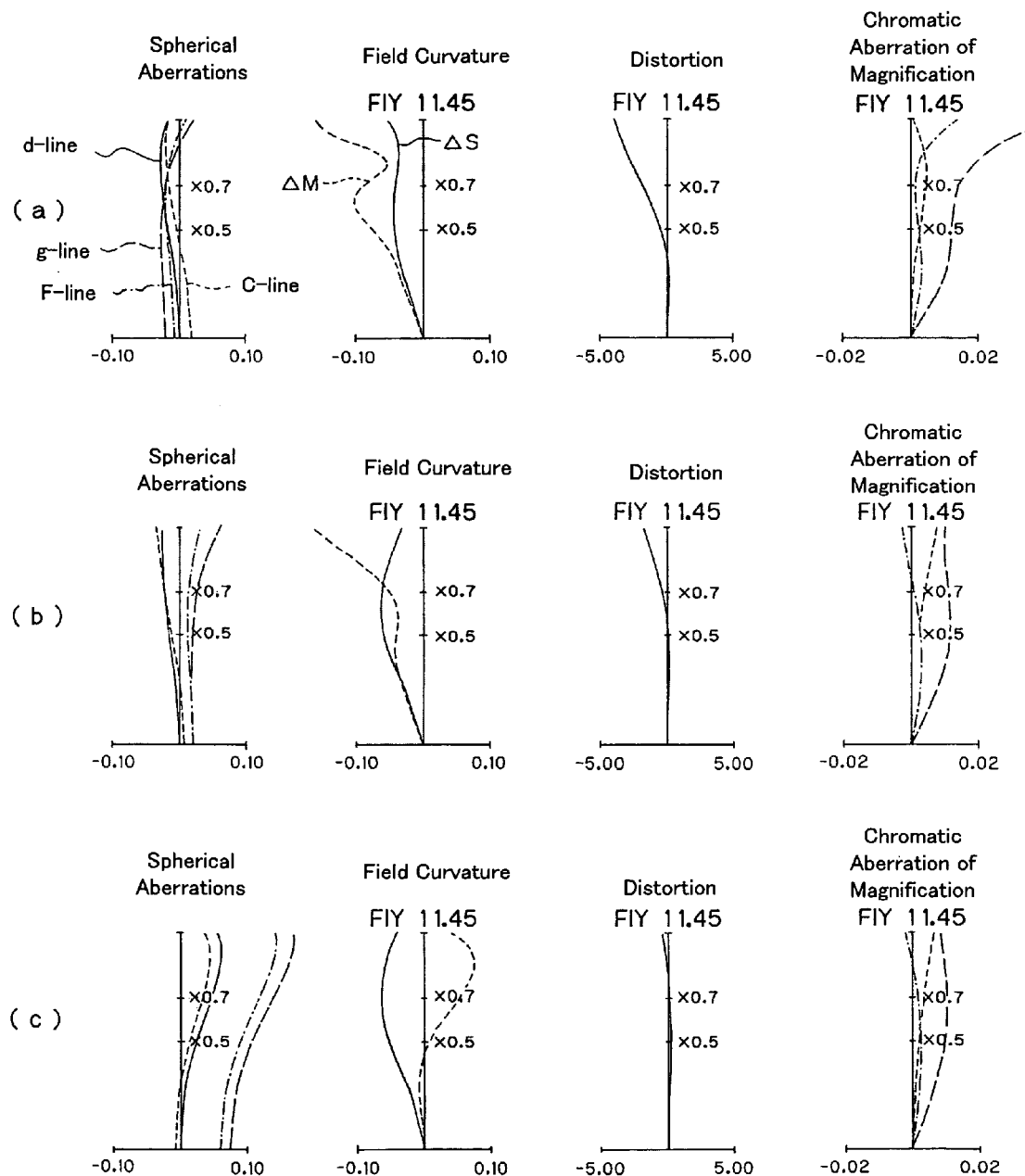
FIG. 15 is an aberration diagram for Example 4 upon focusing at 400 mm.
Figure 16:
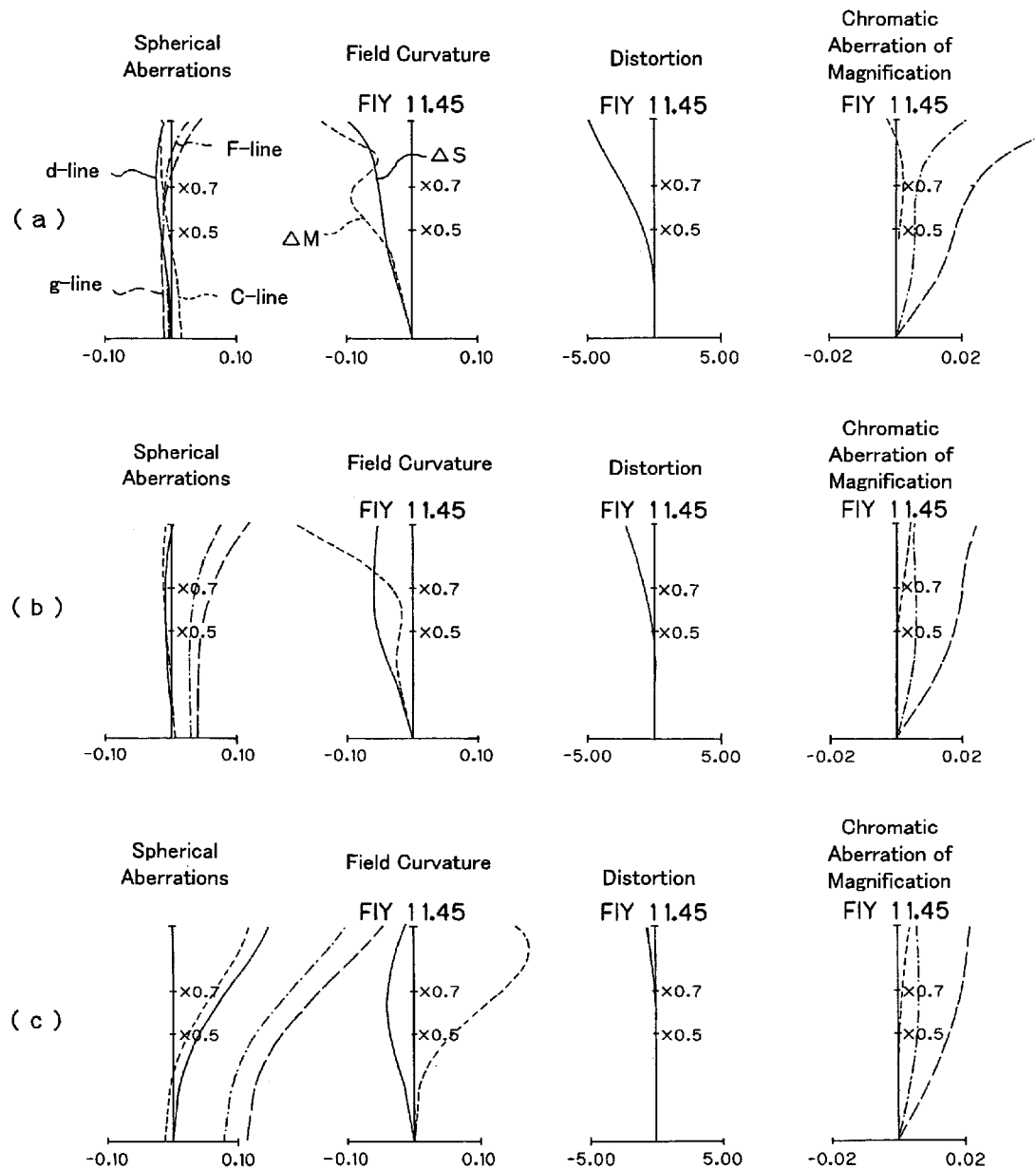
FIG. 16 is an aberration diagram for Example 4 upon focusing at 250 mm.
Figure 17:
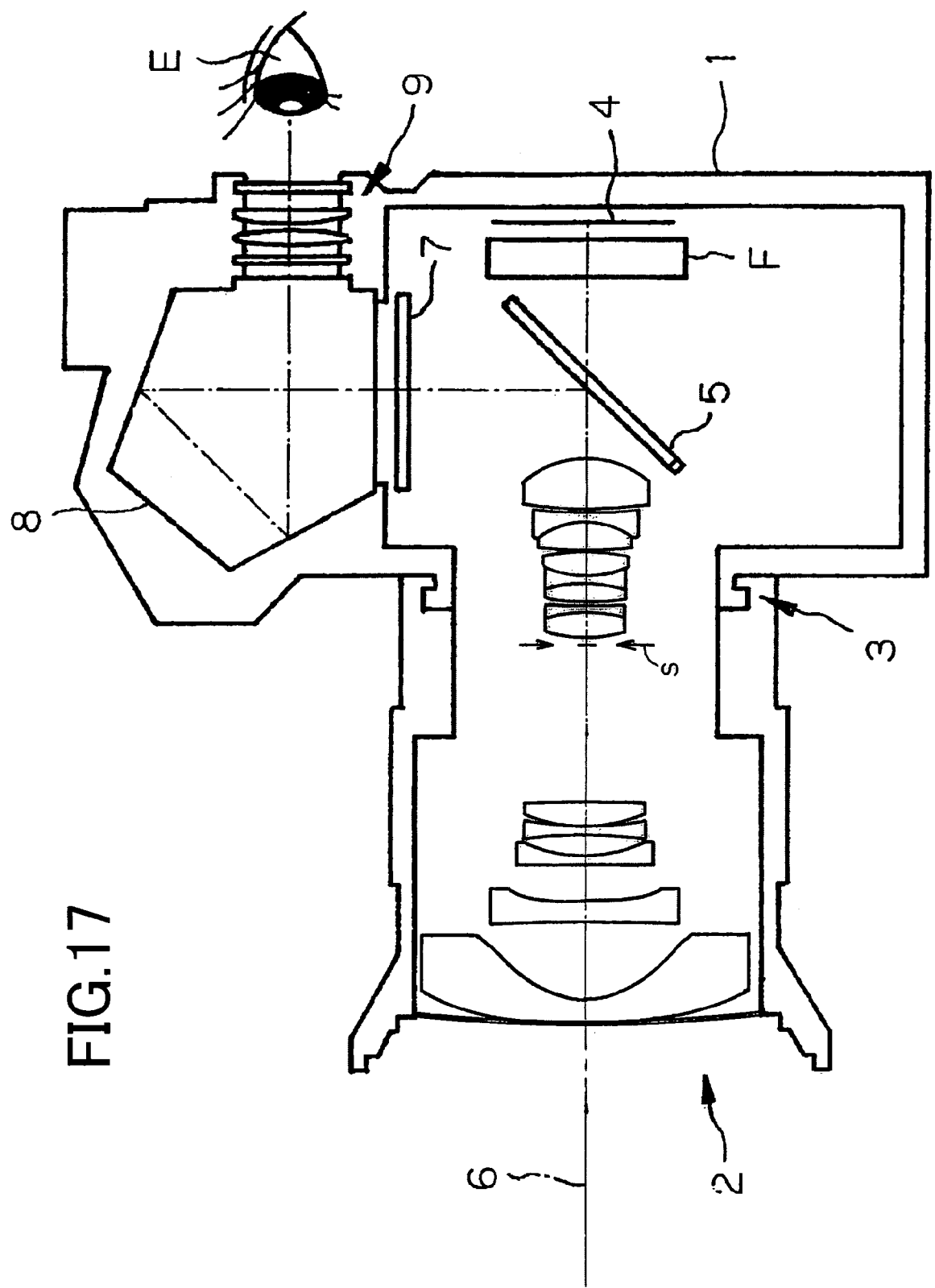
FIG. 17 is a sectional view of a single-lens reflex camera wherein the inventive zoom lens is used as an interchangeable lens.

FIGS. 5, 6 and 7 are aberration diagrams for Example 1 upon focusing on an object point at infinity, at 400 mm and 250 mm. In these aberration diagrams, (a), (b) and (c) are indicative of spherical aberrations, astigmatisms, distortion and chromatic aberrations of magnification at the wide-angle end, in the intermediate setting and at the telephoto end, respectively. Likewise, FIGS. 8, 9 and 10 are aberration diagrams for Example 2 upon focusing on an object point at infinity, at 400 mm and 250 mm; FIGS. 11, 12 and 13 are aberration diagrams for Example 3 upon focusing on an object point at infinity, at 400 mm and 250 mm; and FIGS. 14, 15 and 16 are aberration diagrams for Example 4 upon focusing on an object point at infinity, at 400 mm and 250 mm.

Tabulated below are the values of conditions (1) to (6) in each of the above examples.

| Cond. | Example 1 | Example 2 | Example 3 | Example 4 |
|---|---|---|---|---|
| (1) | −0.946 | −0.951 | −0.952 | −0.961 |
| (2) | 0.418 | 0.455 | 0.430 | 0.446 |
| (3) | 2.998 | 3.005 | 3.064 | 3.131 |
| (4) | 1.001 | 1.012 | 1.046 | 1.026 |
| (5) | 0.0090 | −0.027 | 0.0084 | 0.0331 |
| (6) | 0.337 | 0.370 | 0.332 | 0.337 |

Each example may be modified or varied as follows.

To cut off unessential light such as ghosts and flares, it is acceptable to rely on a flare stop other than the aperture stop. That flare stop may then be located somewhere on the object side of the first lens group, between the first and the second lens group, and between the lens group located nearest to the image plane side and the image plane. A frame member or other member may also be located to cut off flare rays. For that purpose, the optical system may be directly printed, coated or sealed in any desired shape inclusive of round, oval, rectangular, polygonal shapes or a shape delimited by a function curve. Further, just only a harmful light beam but also coma flares around the screen, etc. may be cut off.

Only the upper or the lower limit of the respective conditions may be varied as already noted.

FIG. 16 is a sectional view of the single-lens reflex camera that operates as an electronic imaging apparatus wherein the inventive zoom is used and a small-format CCD or C-MOS or the like is used as the imaging device. In FIG. 16, reference numeral 1 is the single-lens reflex camera, 2 the imaging lens system mounted in a lens barrel having zooming and focusing mechanisms, and 3 a mount portion of the lens barrel that enables the imaging lens system 2 to be attached to or detached from the single-lens reflex camera 1. For that mount, a screw type mount, a bayonet type mount or the like may be used. In this example, the bayonet type mount is used.

Reference numeral 4 is the imaging device plane, 5 is a quick return mirror interposed between the lens system and the imaging device plane 4 on an optical path 6 through the imaging lens system 2, 7 a finder screen located in an optical path taken by light reflected off the quick return mirror 5, 8 a penta prism, 9 a finder, and E the eye of the viewer (eye point).

The inventive zoom lens exemplified by Example 1, 2, 3, and 4, for instance, may be used as the imaging lens system 2 of the single-lens reflex camera 1 arranged as mentioned above.

According to the invention as described above, it is possible to achieve a zoom lens that is used as an interchangeable lens fit for a single-lens reflex type digital camera, and makes sure brightness with reduced fluctuations during or upon zooming. It is then possible to achieve a zoom lens that easily makes sure the angle of view and zoom ratio at the wide-angle end even in bright environments.

What is claimed is:

1. A zoom lens consisting of, in order from its object side, a first lens group of negative refracting power, and a second lens group of positive refractive power wherein zooming from a wide-angle end to a telephoto end is implemented by changing a distance between the respective lens groups, wherein:
said first lens group consists of, in order from its object side,
a front unit of negative refracting power, and
a rear unit of negative refracting power, wherein:
said front unit consists of, in order from its object side,
a first lens that has negative refracting power and meniscus shape, and includes an aspheric surface, and
a second lens that is smaller than the first lens in terms of an absolute value of refracting power, and includes an aspheric surface,
said rear unit consists of, in order from its object side,
a third lens of negative refracting power,
a fourth lens of negative refracting power, and
a fifth lens that has positive refracting power and is convex on its object side, and
upon focusing from infinity to point-blank range, said rear unit moves in such a way as to draw nearer to the object side as a space between said front unit and said rear unit becomes narrow.

2. The zoom lens according to claim 1, wherein said second lens is a plastic lens.

3. The zoom lens according to claim 1, which satisfies the following condition (3):

$$2.95 < f_2/f_W < 3.20 \quad (3)$$

where $f_2$ is a focal length of said second lens group, and
$f_W$ is a focal length of the whole zoom lens system at the wide-angle end.

4. The zoom lens according to claim 1, which satisfies the following condition (4):

$$0.95 < |f_1|/(f_w \times f_t)^{1/2} < 1.10 \quad (4)$$

where $f_1$ is a focal length of said first lens group,
$f_w$ is a focal length of the whole zoom lens system at the wide-angle end, and
$f_t$ is a focal length of the whole zoom lens system at the telephoto end.

5. The zoom lens according to claim 1, wherein upon focusing, said front unit remains fixed, and only said rear unit moves.

6. The zoom lens according to claim 1, which satisfies the following condition (5):

$$-0.05 < f_{101}/f_{102} < 0.05 \tag{5}$$

where $f_{101}$ is a paraxial focal length of said first lens, and
$f_{102}$ is a paraxial focal length of said second lens.

7. The zoom lens according to claim 1, which satisfies the following condition (6):

$$0.31 < f1_{\_G1a}/f1_{\_G1b} < 0.39 \tag{6}$$

where $f1_{\_G1a}$ is a combined focal length of said front unit, and
$f1_{\_G1b}$ is a combined focal length of said rear unit.

8. A zoom lens consisting of, in order from its object side,
a first lens group of negative refracting power, and
a second lens group of positive refractive power wherein zooming from a wide-angle end to a telephoto end is implemented by changing a distance between the respective lens groups, wherein:
said first lens group consists of, in order from its object side,
a front unit of negative refracting power, and
a rear unit of negative refracting power, wherein:
said front unit consists of, in order from its object side,
a first lens that has negative refracting power and meniscus shape, and includes an aspheric surface, and
a second lens that is smaller than the first lens in terms of an absolute value of refracting power, and includes an aspheric surface,
said rear unit consists of, in order from its object side,
a third lens of negative refracting power,
a fourth lens of negative refracting power, and
a fifth lens that has positive refracting power and is convex on its object side, with satisfaction of the following conditions (1) and (2):

$$-1.00 < R_{01\_im}/\{(nd_{o1}-1) \times f_{101}\} < -0.92 \tag{1}$$

$$0.40 < (SAG_{01\_im} - SAG_{01\_ob})/R_{01\_im} < 0.48 \tag{2}$$

where $R_{01\_im}$ is a paraxial radius of curvature of an image-side surface of said first lens,
$nd_{o1}$ is a d-line refractive index of said first lens,
$f_{101}$ is a focal length of said first lens,
$SAG_{01\_im}$ is an amount of sagging of a diameter of the image-side surface of said first lens as a chief ray of a maximum image height passes upon focusing on infinity at the wide-angle end, and
$SAG_{01\_ob}$ is an amount of sagging of a diameter of an object-side surface of said first lens as a chief ray of the maximum image height passes upon focusing on infinity at the wide-angle end.

9. The zoom lens according to claim 8, wherein said second lens is a plastic lens.

10. The zoom lens according to claim 8, which satisfies the following condition (3):

$$2.95 < f_2/f_W < 3.20 \tag{3}$$

where $f_2$ is a focal length of said second lens group, and
$f_W$ is a focal length of the whole zoom lens system at the wide-angle end.

11. The zoom lens according to claim 8, which satisfies the following condition (4):

$$0.95 < |f_1|/(f_w \times f_t)^{1/2} < 1.10 \tag{4}$$

where $f_1$ is a focal length of said first lens group,
$f_w$ is a focal length of the whole zoom lens system at the wide-angle end, and
$f_t$ is a focal length of the whole zoom lens system at the telephoto end.

12. The zoom lens according to claim 8, wherein upon focusing, said front unit remains fixed, and only said rear unit moves.

13. The zoom lens according to claim 8, which satisfies the following condition (5):

$$-0.05 < f_{101}/f_{102} < 0.05 \tag{5}$$

where $f_{101}$ is a paraxial focal length of said first lens, and
$f_{102}$ is a paraxial focal length of said second lens.

14. The zoom lens according to claim 8, which satisfies the following condition (6):

$$0.31 < f1_{\_G1a}/f1_{\_G1b} < 0.39 \tag{6}$$

where $f1_{\_G1a}$ is a combined focal length of said front unit, and
$f1_{\_G1b}$ is a combined focal length of said rear unit.

* * * * *